(12) United States Patent
Utsunomiya

(10) Patent No.: US 7,967,446 B2
(45) Date of Patent: Jun. 28, 2011

(54) LIQUID CRYSTAL PROJECTOR APPARATUS AND COOLER

(75) Inventor: Motoyasu Utsunomiya, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 0 days.

(21) Appl. No.: 12/718,779

(22) Filed: Mar. 5, 2010

(65) Prior Publication Data

US 2010/0157176 A1  Jun. 24, 2010

Related U.S. Application Data

(62) Division of application No. 11/001,320, filed on Dec. 2, 2004, now Pat. No. 7,703,927.

(30) Foreign Application Priority Data

Dec. 2, 2003  (JP) .................................. 2003-402880

(51) Int. Cl.
  *G03B 21/18*  (2006.01)
  *G02F 1/1333*  (2006.01)
  *H04N 5/74*  (2006.01)
(52) U.S. Cl. ........................... 353/54; 349/161; 348/748
(58) Field of Classification Search .................... 353/57, 353/52, 54, 56, 58, 60, 61; 349/161; 348/748
  See application file for complete search history.

(56) References Cited

U.S. PATENT DOCUMENTS

| | | | |
|---|---|---|---|
| 5,170,195 | A | 12/1992 | Akiyama et al. |
| 7,703,927 | B2 * | 4/2010 | Utsunomiya ................... 353/54 |
| 2004/0032665 | A1 | 2/2004 | Fujimori et al. |

FOREIGN PATENT DOCUMENTS

| | | |
|---|---|---|
| JP | 3-288187 | 12/1991 |
| JP | 5-167143 | 7/1993 |
| JP | 5-264947 | 10/1993 |
| JP | 9-113998 | 5/1997 |
| JP | 2000-089364 | 3/2000 |
| JP | 2000-286483 | 10/2000 |
| JP | 2000-305176 | 11/2000 |
| JP | 2001-330818 | 11/2001 |
| JP | 2002-131737 | 5/2002 |
| JP | 2002-214596 | 7/2002 |
| JP | 2002-268038 | 9/2002 |
| JP | 2002-357803 | 12/2002 |
| JP | 2003-057754 | 2/2003 |
| JP | 2003-075912 | 3/2003 |
| JP | 2003-110264 | 4/2003 |
| JP | 2003-195421 | 7/2003 |
| JP | 2003-322848 | 11/2003 |

* cited by examiner

Primary Examiner — Rochelle-Ann J Blackman

(74) Attorney, Agent, or Firm — Young & Thompson

(57) ABSTRACT

A liquid crystal projector apparatus has a liquid crystal unit having a liquid crystal panel for modulating light, an incident side polarizing plate and an exit side polarizing plate disposed in front of and behind the liquid crystal panel along the optical axis, respectively, a first holder member for holding the liquid crystal unit, a first heat exchanger disposed in close proximity to the first holder member for dissipating heat generated by the liquid crystal unit and then conducted to the first holder member using a coolant liquid which passes through a first channel formed inside the first heat exchanger, a pump for circulating the coolant liquid, and a radiator for cooling the coolant liquid.

2 Claims, 25 Drawing Sheets

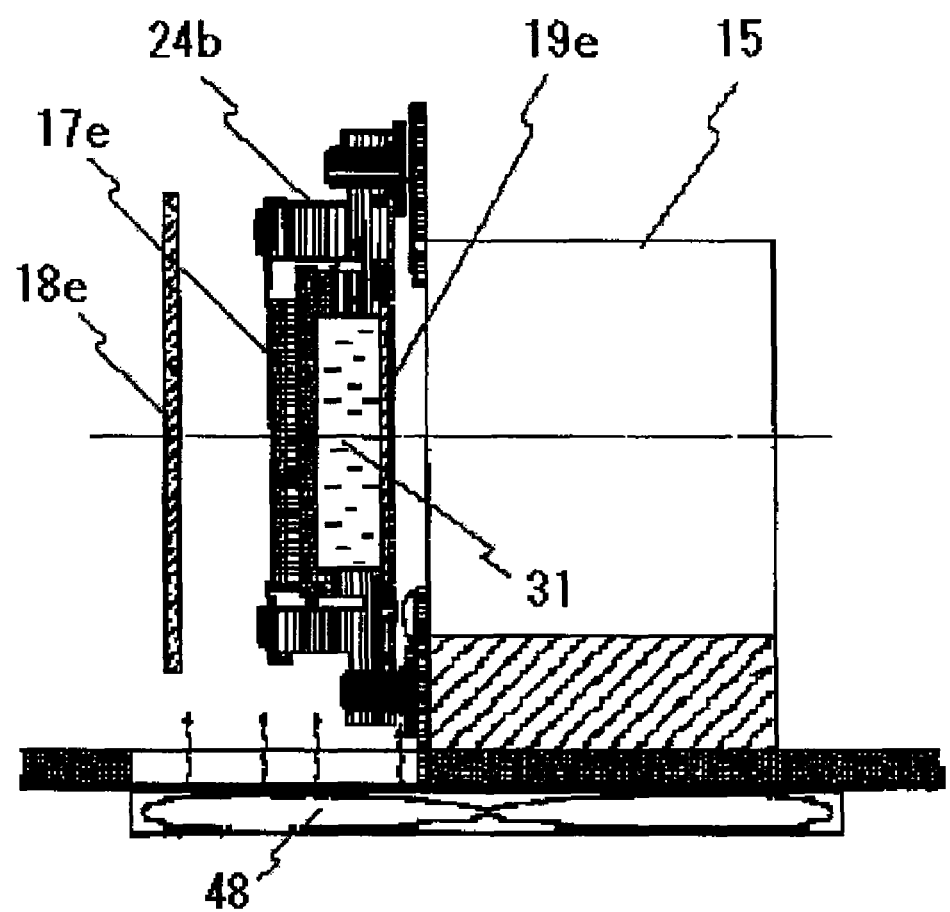
Fig.4            PRIOR ART

LIQUID CRYSTAL PROJECTOR APPARATUS AND COOLER

BACKGROUND OF THE INVENTION

1. Field of the Invention

The present invention relates to a liquid crystal projector apparatus for projecting an image using a liquid crystal panel, and more particularly, to a structure and method for cooling the liquid crystal panel and polarizing plate.

2. Description of the Related Art

Liquid crystal projector apparatuses have been dramatically improved in image quality, resulting from an increase in the luminance of a light source, refinement of liquid crystal light valves, and the like, and are now utilized widely from home theater applications to business presentations.

FIG. 1 illustrates the basic configuration of a liquid crystal projector apparatus. Liquid crystal projector apparatus 1 comprises three optical systems including illumination optical system 2, color separating optical system 7, and light composing optical system 13.

Illumination optical system 2 comprises light source 3 including a high luminance lamp such as a metal halide lamp, an ultra-high pressure mercury lamp, or the like; reflector 4 for reflecting light from light source 3; optical integrators 5a, 5b each for uniformarizing a luminance distribution of reflected light from reflector 4; and polarization beam splitter (PBS) 6 for transforming randomly polarized light from light source 3 into linearly polarized light.

Color separating optical system 7 comprises dichroic mirrors 8a, 8b each for separating an entire light flux from illumination optical system 2 into individual color light fluxes of red (R), green (G), and blue (B) and directing the separated color light fluxes to respective liquid crystal panels corresponding thereto; reflective mirrors 9a, 9b, 9c; and relay lenses 10a, 10b.

Light composing optical system 13 comprises light modulator 14 for modulating the respective color light fluxes applied from color separating optical system 7 in accordance with given image information; color combiner prism 15 for combining the modulated color light fluxes; and projection lens 16 for projecting the combined light flux onto a screen.

Among the foregoing components, light modulator 14 in light composing optical system 13 comprises liquid crystal panels 17a, 17b, 17c, each of which is a transmission type display device; incident side polarizing plates 18a, 18b, 18c each disposed on the incident side of liquid crystal panel 17a, 17b, 17c; and exit side polarizing plates 19a, 19b, 19c each disposed on the exit side of liquid crystal panel 17a, 17b, 17c. Since a TN (Twisted Nematic) liquid crystal panel can exclusively handle a particular linearly polarized light component, respective color light fluxes from color separating optical system 7 are uniformly directed in a predetermined polarization direction (P-polarized light) by incident side polarizing plates 18a, 18b, 18c. After the P-polarized light is modulated by liquid crystal panels 17a, 17b, 17c, S-polarized light components of the modulated light is only allowed to pass through exit side polarizing plates 19a, 19b, 19c.

While the optical configuration shown herein is associated with a three-plate type liquid crystal projector apparatus which separates light from a light source into three primary colors which are individually modulated by three liquid crystal panels, a light modulator in a similar configuration is also used in a low-luminance, inexpensive, single-plate type liquid crystal projector apparatus which employs only one liquid crystal panel.

In light modulator 14 in the configuration as described above, incident side polarizing plates 18a, 18b, 18c and exit side polarizing plates 19a, 19b, 19c tend to generate heat because each of these plates allows only polarized light in a single axial direction to pass therethrough and shields (absorbs) the remaining polarized light. Likewise, liquid crystal panels 17a, 17b, 17c involve the generation of heat when in operation, because transmitted light is shielded in a lattice-shaped wire called a black matrix which surrounds pixels on the panel. Liquid crystal panels 17a, 17b, 17c, incident side polarizing plates 18a, 18b, 18c, and exit side polarizing plates 19a, 19b, 19c are often made of organic materials, so that if these components are irradiated with short-wavelength light or exposed to a high-temperature environment for a long time, their functions are significantly compromised due to damaged panel alignment films, lowered polarized light selection characteristics, and the like. Such functional damages will result in a shorter lifetime of products, an increased running cost caused by frequent replacements of damaged components, a degradation in combined projection images due to variations in the respective color light characteristics. Therefore, some countermeasures must be taken against heat for these light modulators.

The following description will be made on a cooling method which has been conventionally employed for limiting a rise in temperature of the incident side polarizing plates, exit side polarizing plates, and liquid crystal panels (hereinafter these members are collectively called "liquid crystal unit 23").

FIGS. 2A, 2B are explanatory diagrams generally illustrating an exemplary method of cooling a liquid crystal unit based on a forced air cooling scheme. FIG. 2A illustrates a perspective view of the cooling structure unit, wherein cooling fan 20, which comprises an axial fan or a radial fan, takes external air from a suction port of a liquid crystal projector housing (not shown), and introduces cooling air from an outlet port of cooling fan 20 to duct opening 22 beneath liquid crystal unit 23 through duct 21. As illustrated in FIG. 2B, incident side polarizing plates 18a, 18b, 18c, liquid crystal panels 17a, 17b, 17c, and exit side polarizing plates 19a, 19b, 19c, which make up liquid crystal unit 23, are spaced apart from one another such that the cooling air passes upward through gaps therebetween to take the heat on surfaces to be cooled, i.e., cool the members. An air flow, which has been heated by the heat exhausted from liquid crystal unit 23, is emitted to the outside of the housing from an exhaust port of the liquid crystal projector housing.

Other than the air cooling scheme, a liquid cooling scheme is also used for the liquid crystal unit. The liquid cooling scheme involves immersing heat-generating members of the liquid crystal unit in a coolant container filled with a coolant liquid to transport the heat generated in the liquid crystal unit through natural convection of the coolant liquid which has a high heat conductivity, and is disclosed, for example, in specification etc. of Japanese Patent Laid-open Publication No. 2002-214596. FIGS. 3A, 3B are conceptual diagrams illustrating an exemplary liquid cooling structure applied for cooling an exit side polarizing plate. In FIG. 3A, incident side polarizing plate 18d, liquid crystal panel 17d, exit side polarizing plate 19d, and color combiner prism 15 are spaced apart from one another in an order in which light travels therethrough. As illustrated in a partially enlarged view of FIG. 3B, exit side polarizing plate 19d is adhered to transparent substrate 30a of a cooling element, and cooled by the cooling element. The cooling element comprises metal frame 24a; two transparent substrates 30a, 30b adhered to openings of metal frame 24a with a gap therebetween; and coolant liquid 31 filled in an internal space defined between transparent substrates 30a, 30b.

FIG. 4 is a conceptual diagram illustrating another prior art liquid cooling structure which is disclosed in specification etc. of Japanese Patent Laid-open Publication No. 2002-357803. Liquid crystal panel 17e and exit side polarizing plate 19e are contained within metal frame 24b such that they are spaced apart from each other, and coolant liquid 31 is filled and enclosed in the internal space defined by liquid crystal panel 17e and exit side polarizing plate 19e to simultaneously cool liquid crystal panel 17e and exit side polarizing plate 19e.

Either of the foregoing examples takes heat from members to be cooled through a coolant liquid, transports the heat to a metal frame by circulating the coolant liquid through convection, and cools the metal frame together with other liquid crystal unit members which are not immersed in the coolant liquid, by an air cooling fan disposed outside to dissipate the heat.

As disclosed in specification etc. of Japanese Patent Laid-open Publication No. 2003-195421, a method of improving cooling capabilities of a liquid crystal panel itself, which forms part of a liquid crystal unit, bonds a heat dissipating plate(s) or the like made of a transparent thin plate material having a thermal conductivity higher than liquid crystal panel components on one or both of the incident surface and exit surface of a liquid crystal panel. With the plate having a high thermal conductivity bonded to a heat generating surface, thermal diffusion on the panel surface is increased to improve the cooling capabilities.

Further, in a conventional liquid crystal projector apparatus, as shown in specification etc. of Japanese Patent Laid-open Publication No. 2003-75912, a liquid crystal panel, which forms part of a liquid crystal unit, is often provided with an adjusting function (adjustments of the optical axes) for adjustments in the vertical, horizontal, and rotating directions to permit alignments among respective pixels on the panel for a registration adjustment to precisely superimpose projected images from liquid crystal panels corresponding to the respective colors on a screen. FIGS. 5A, 5B illustrate an exemplary method of supporting a liquid crystal panel which can be optically adjusted. As illustrated in FIG. 5A, liquid crystal panel 17c is supported at a location spaced apart from color combiner prism 15. As illustrated in FIG. 5B which is a detailed cross-sectional view of the supporting structure, liquid crystal panel 17c is securely held by fixture 26c, and four corners of fixture 26c are supported at four points by holder protrusions 27, and are securely adhered after the optical axis has been adjusted. As a result, liquid crystal panel 17c itself is supported as if it were fixed in the air. To improve heat dissipation capabilities of this type of liquid crystal panel, a method has been disclosed for fixing the liquid crystal panel (fixture) and panel fixing frame (holder protrusions) with a thermally conductive adhesive resin.

In the prior art liquid crystal projector apparatuses described above, first of all, the following problems have been recognized in the liquid crystal projector apparatus which employs a forced air cooling scheme using a cooling fan.

A first problem is noise. A demand for higher luminance of liquid crystal projector apparatuses drives an increase in lamp power, whereas liquid crystal panels tend to be reduced in size in response to a demand for a reduction in the size of the apparatuses, necessarily resulting in an increase in the density of light flux incident on the liquid crystal unit which suffers an increased heat load. In the forced convection using a cooling fan, since its average thermal conductivity is proportional to ½ power of wind speed, the wind speed must be increased for effectively dissipating heat generated in the liquid crystal unit. While there are two methods contemplated for increasing a cooling wind speed, i.e., the employment of a larger fan, and an increase in the wind speed, the former method is not compatible with the demand for a reduction in size, and may often encounter difficulties in physically installing a larger fan in a housing. Therefore, a small fan is rotated at a higher speed to increase the amount of supply air to ensure the cooling capabilities. However, an increase in the rotational speed of the fan causes increased noise which exacerbates the comfort of the user.

A second problem is the reliability. When a light modulator is cooled down through forced air cooling in a liquid crystal projector apparatus, a problem is caused by dust particles which are mixed in cooling air taken from external air. A liquid crystal light valve has a pixel size of 26 μm square in a 1.3" XGA, so that if dust particles of a size on the order of several tens of micrometers stick on an imaging surface of the panel, enlarged shadows of the dust particles are projected onto a screen together with an image to degrade the image quality. To solve this problem, a finer filter may be attached to a suction port for enhancing a filtering function, but will cause another problem of an increased loss of suction pressure of the fan to cause a reduced amount of supply air and a resulting failure in providing sufficient cooling performance.

On the other hand, a liquid crystal projector apparatus which employs a liquid cooling scheme implies the following problems. A first problem is the image quality. When a coolant liquid is filled between components of a liquid crystal unit (for example, between liquid crystal panel 17e and exit side polarizing plate 19e in FIG. 4), a liquid layer intervenes in a light transmission space, and therefore causes disturbed polarization of light which transmits the liquid layer due to variations in coolant density arising from generation of air bubble and thermal transportation, and due to non-uniform convection resulting therefrom, resulting in discrepancy in image information which passes through the exit side polarizing plate, and a degraded quality of a projected image.

A second problem is the reliability and mountability. Since the heat is dissipated from the liquid crystal unit through the encapsulated coolant liquid, the coolant liquid repeats expansion and contraction as it is used. While a coolant container is provided with a pressure adjusting mechanism for accommodating the expansion and contraction of the coolant liquid, a pressure adjusting member may be damaged in a long-term service to possibly cause a leak of the coolant liquid. In addition, a complicated sealing structure and pressure adjusting structure of the coolant container could significantly impair the ease of assembly of an optical engine.

Further, the aforementioned liquid crystal projector apparatus of the type which fixes a liquid crystal panel by a holder member in the air has problems in that the connection areas of the protrusions which support the liquid crystal panel at four points are not sufficient to absorb the heat generated in the liquid crystal panel, and that a sufficient thermal connection cannot be ensured due to limitations imposed by the heat conducting performance of the adhesive resin. In addition, when the liquid crystal panel is fixed by the holding mechanism of the holder member in a manner similar to the other polarizing plates, the liquid crystal panel can be affected by the rigidity of the holding mechanism, resulting in the possibility in going out of alignment during assembling or in operation. However, it is difficult to accomplish a thermal connection without affecting the posture of the liquid crystal panel fixed in the air.

SUMMARY OF THE INVENTION

It is an object of the present invention to provide a method and mechanism for cooling a liquid crystal unit, which has sufficient cooling capabilities with low noise and high reliability.

It is another object of the present invention to provide a liquid crystal projector apparatus and a method of cooling the liquid crystal projector apparatus which accomplishes a higher luminance and a silenced operation, and has a long lifetime and high reliability.

A liquid crystal projector apparatus according to the present invention includes a liquid crystal panel for modulating light, an incident side polarizing plate and an exit side polarizing plate disposed in front of and behind the liquid crystal panel along an optical axis, respectively, a first holder member for holding the liquid crystal panel, incident side polarizing plate, and exit side polarizing plate, and a first heat exchanger disposed in close proximity to the first holder member for dissipating heat generated by the liquid crystal panel, incident side polarizing plate, or exit side polarizing plate and conducted to the first holder member.

With the foregoing configuration, heat generated by the liquid crystal panel, incident side polarizing plate, and exit side polarizing plate is transferred to the first holder member which holds these components, and the heat is dissipated by the first heat exchanger in close proximity to the first holder member, thus eliminating the need for a forced air cooling mechanism for dissipating such heat the problems of dust particles sticking to the liquid crystal unit, which can cause a problem in an air cooling scheme, and a degraded image quality are reduced. In addition, the liquid crystal projector apparatus excels in silenced operation because it does not need a large capacity air cooling fan.

In the liquid crystal projector apparatus of the present invention, the first heat exchanger may include a first channel formed therein for passing a coolant liquid therethrough for dissipating the heat, and the liquid crystal projector apparatus may further include circulating means for circulating the coolant liquid, and coolant liquid cooling means for cooling the coolant liquid. This liquid cooling system can accomplish higher efficiency of cooling.

The first heat exchanger may be disposed on a surface of the first holder member opposite to a surface for holding the liquid crystal panel, incident side polarizing plate, and exit side polarizing plate, and the first channel passes positions substantially opposite to positions at which the liquid crystal panel, incident side polarizing plate, and exit side polarizing plate are held by the first holder member. Accordingly, since the heat from the liquid crystal panel etc. is dissipated through the first holder member and first heat exchanger, the optical system is not basically affected by the coolant liquid, and therefore will not suffer from a degraded image quality.

A method of cooling a liquid crystal projector apparatus according to the present invention relates to a liquid crystal projector apparatus having a liquid crystal panel for modulating light, an incident side polarizing plate and an exit side polarizing plate disposed in front of and behind the liquid crystal panel along an optical axis, respectively, a first holder member for holding the liquid crystal panel, the incident side polarizing plate, and the exit side polarizing plate. The method comprising the steps of: disposing a first heat exchanger in close proximity to the first holder member; transferring heat generated by the liquid crystal panel, the incident side polarizing plate, or the exit side polarizing plate and then conducted to the first holder member to the first heat exchanger through surface thermal conduction between an outer surface of said first holder member and an outer surface of said first heat exchanger; and dissipating the heat transferred to the first heat exchanger.

With the foregoing configuration employing liquid cooling system, a liquid crystal projector apparatus and a method of cooling a liquid crystal projector apparatus of the present invention enables cooling without introducing dust particles. The apparatus and method eliminate the possibility of dust particles sticking to the liquid crystal unit, degraded image quality. In addition, the apparatus and method excels in silenced operation because they do not need a large capacity air cooling fan.

As a result of employing the structure for exhausting heat to a liquid cooling module through the holder member and heat exchanger, rather than a structure which relies on the convection for dissipating heat with a liquid crystal unit directly immersed in a coolant liquid, the optical system is not basically affected by the coolant liquid. Consequently, the liquid crystal projector apparatus of the present invention will not suffer from a degraded image quality, and excels in mountability.

Further, the cooling section, which is structured independently of the liquid crystal unit, facilitates the optimization for the designing of the heat exchanger, channel, etc. Consequently, high cooling capabilities can be provided for a particular condition in accordance with the configuration of the liquid crystal unit and the amount of generated heat.

As will be appreciated from the foregoing, the present invention can provide a liquid crystal projector apparatus which has a long lifetime and high reliability while satisfying requirements for a higher luminance and quietness, as well as a cooling mechanism and a cooling method for the liquid crystal projector apparatus.

The above and other objects, features and advantages of the present invention will become apparent from the following description with reference to the accompanying drawings which illustrate examples of the present invention.

BRIEF DESCRIPTION OF THE DRAWINGS

FIG. 4 is a cross-sectional view illustrating a liquid crystal unit cooling structure (liquid cooling) of a conventional liquid crystal projector apparatus;

DETAILED DESCRIPTION OF THE PREFERRED EMBODIMENTS

Figure 6:
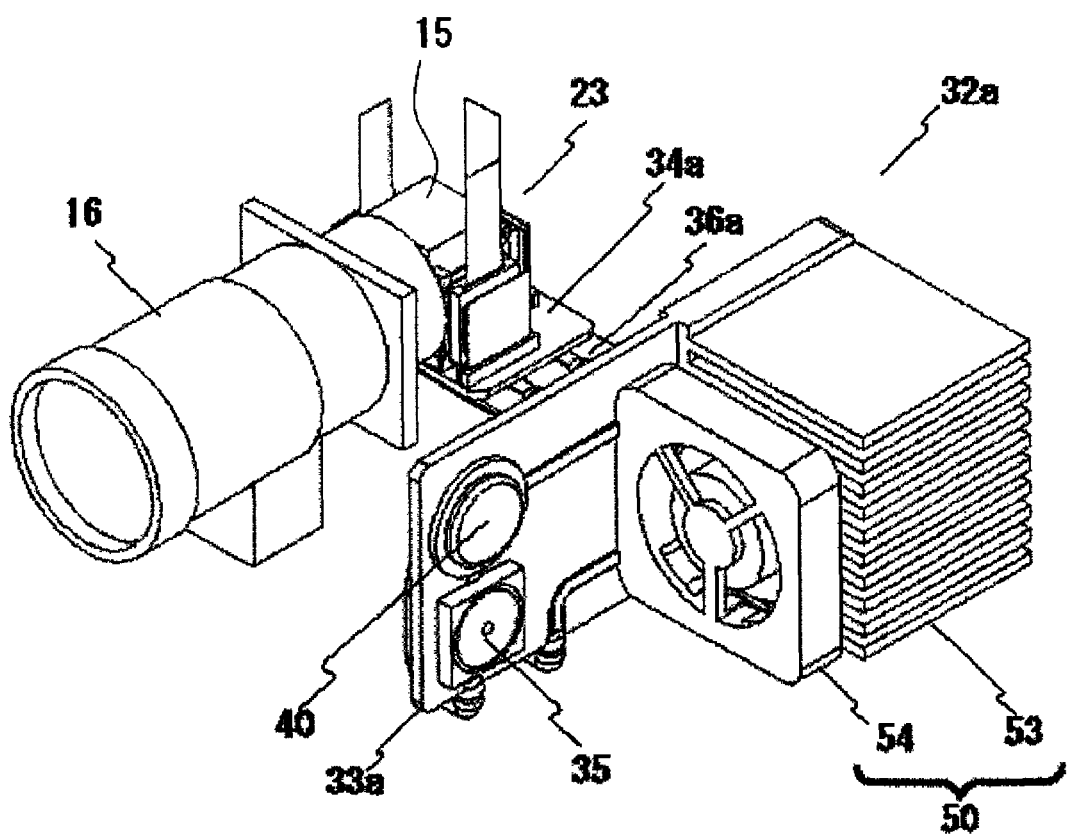
FIG. 6 is a perspective view illustrating an optical system and a liquid crystal unit cooling system extracted from a liquid crystal projector apparatus according to a first embodiment of the present invention.
Figure 7:
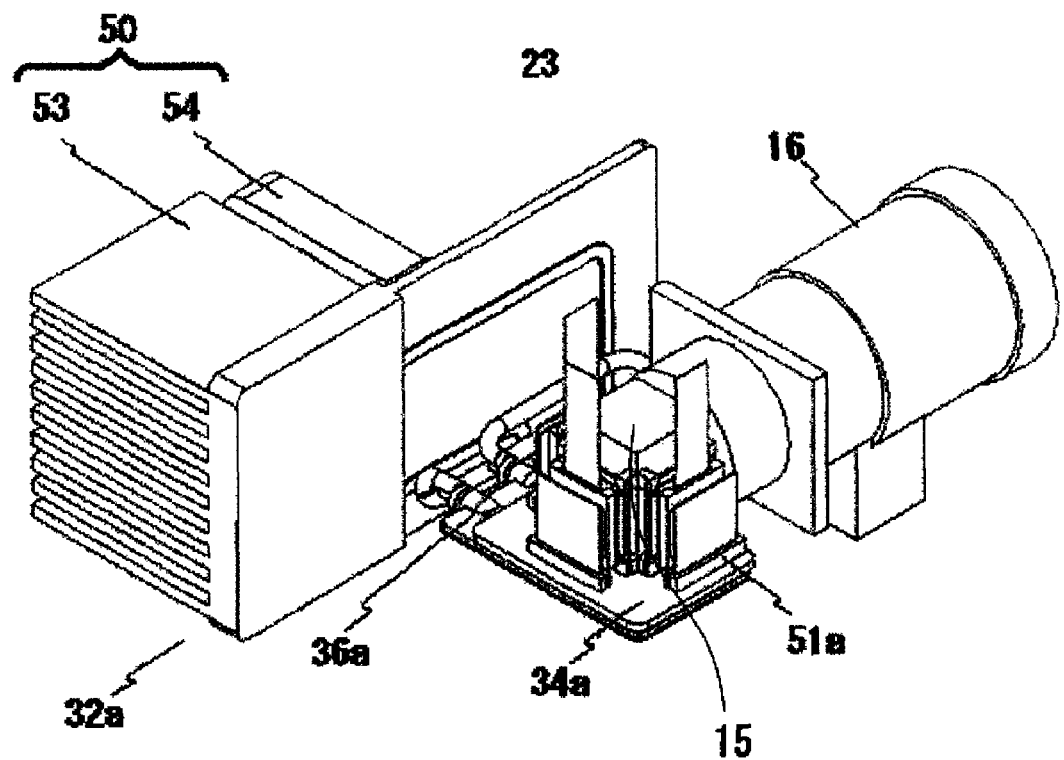
FIG. 7 is a perspective view of the liquid crystal projector apparatus illustrated in FIG. 6, taken from another direction.
Figure 8:
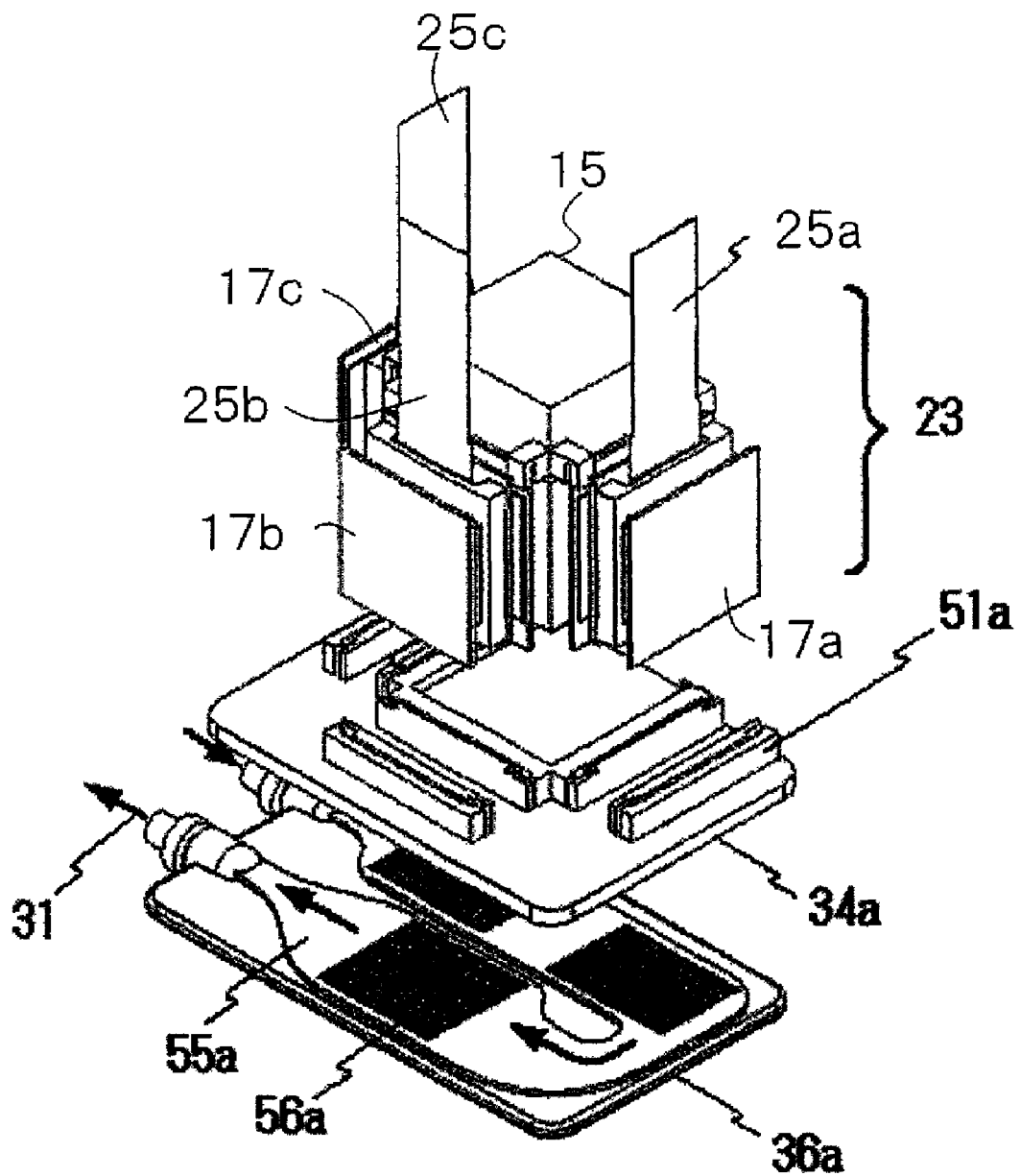
FIG. 8 is an exploded perspective view illustrating part of the liquid crystal unit and liquid crystal unit cooling system in the liquid crystal projector apparatus illustrated in FIG. 6.
Figure 9:
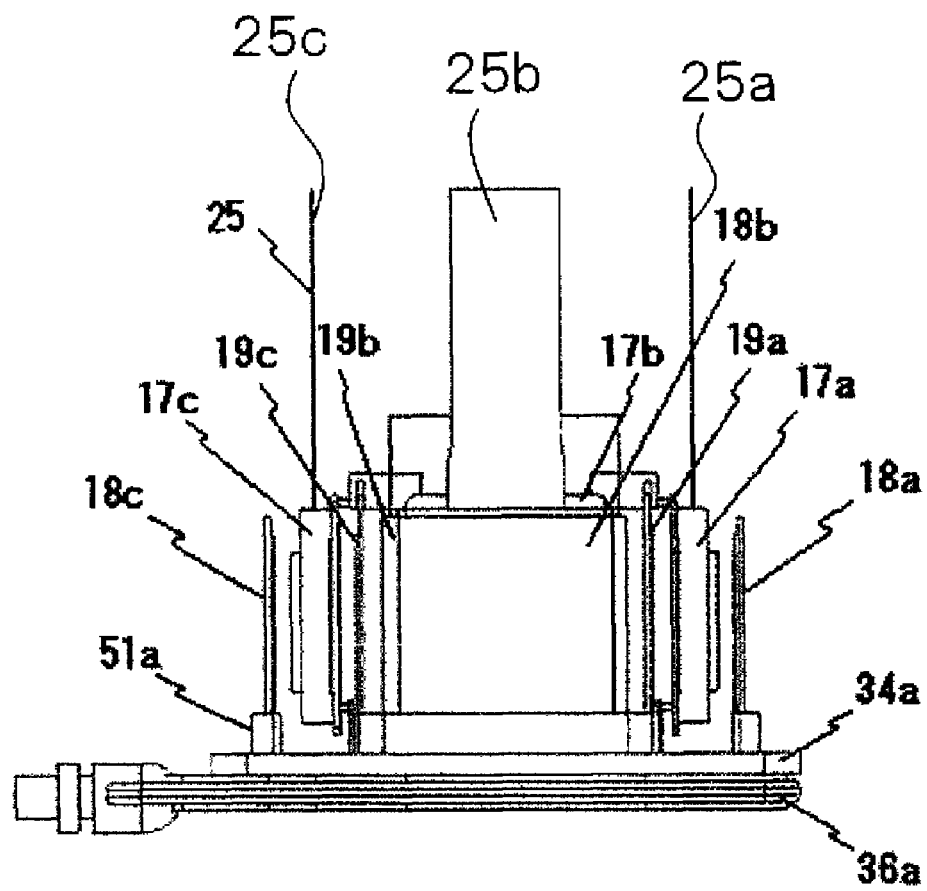
FIG. 9 is a front view of the liquid crystal unit and liquid crystal unit cooling system illustrated in FIG. 8.
Figure 10:
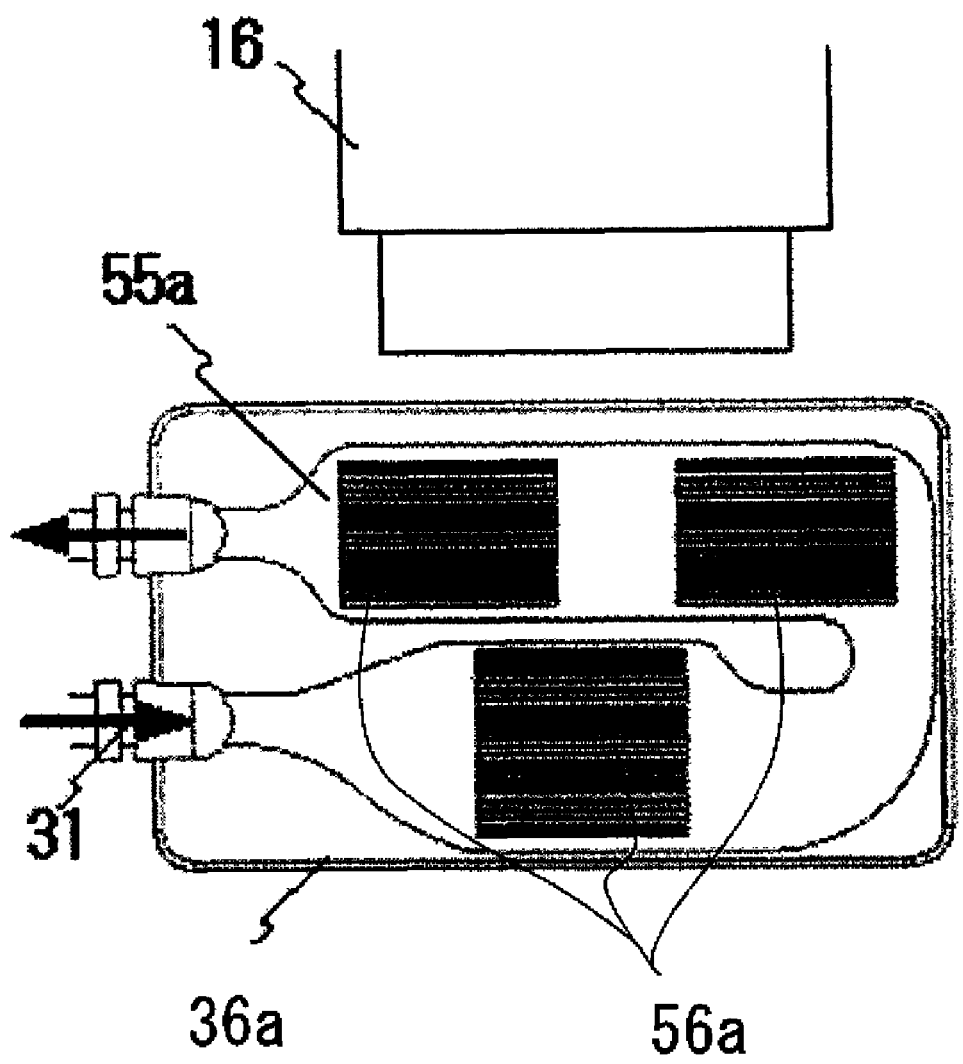
FIG. 10 is a plan view illustrating the internal structure of a heat exchanger for the liquid crystal projector apparatus illustrated in FIG. 6.

FIG. 6 is a perspective view illustrating an optical system and a liquid crystal unit cooling system extracted from a liquid crystal projector apparatus according to a first embodiment of the present invention. FIG. 7 is a perspective view of the liquid crystal projector apparatus illustrated in FIG. 6, taken from another direction. FIG. 8 is an exploded perspective view illustrating part of the liquid crystal unit and liquid crystal unit cooling system in the liquid crystal projector apparatus illustrated in FIG. 6. FIG. 9 is a front view of the liquid crystal unit and liquid crystal unit cooling system illustrated in FIG. 8. FIG. 10 is a plan view illustrating the internal structure of a heat exchanger for the liquid crystal projector apparatus illustrated in FIG. 6.

Referring first to FIGS. 6 and 7, liquid crystal unit cooling system 32a comprises liquid crystal unit 23 and liquid cooling module 33a.

Liquid crystal unit 23, as illustrated in FIGS. 8 and 9 in greater details, comprises liquid crystal panels 17a, 17b, 17c corresponding to the respective color light; incident side polarizing plates 18a, 18b, 18c; exit side polarizing plates 19a, 19b, 19c; color combiner prism 15; and first holder member 34a for integrally holding these components. Liquid crystal panels 17a, 17b, 17c, incident side polarizing plates 18a, 18b, 18c, and exit side polarizing plates 19a, 19b, 19c are disposed in correspondence to incident planes of the respective color light associated therewith, and are common to those used in conventional liquid crystal projector apparatuses. Each of liquid crystal panels 17a, 17b, 17c has a flexible printed circuit board (hereinafter called "FPC 25a, 25b, 25c") attached thereto for providing signal lines for controlling the liquid crystal panel. Projection lens 16 is connected to liquid crystal unit 23 for projecting a light flux combined by color combiner prism 15 as an image. In the following description, when reference is made to structure members of liquid crystal unit 23, the structure members mean liquid crystal panels 17a, 17b, 17c, incident side polarizing plates 18a, 18b, 18c, exit side polarizing plates 19a, 19b, 19c, and color combiner prism 15.

First holder member 34a for holding liquid crystal unit 23 is made of a material which excels in thermal conductivity and has high workability, for example, aluminum, magnesium alloy, and the like, and comprises holding mechanism 51a for integrally fixing the structure members of liquid crystal unit 23 at predetermined positions. First holder member 34a is disposed in close proximity to and thermally connected to first heat exchanger 36a, later described, on the surface opposite to that for holding liquid crystal panels 17a, 17b, 17c, incident side polarizing plates 18a, 18b, 18c, and exit side polarizing plates 19a, 19b, 19c.

Holding mechanism 51a can be comprised, for example, of a fixing groove, a holding plate, or the like, but not limited thereto, and any mechanism may be used as long as it can securely fixes the structure members of liquid crystal unit 23, and thermally connects with first holder member 34a and first heat exchanger 36a. The contact surface of holding mechanism 51 with the structure members of liquid crystal unit 23 may be provided with a thermal interface such as a high thermally conductive sheet, silicone grease, a phase change sheet, or the like to reduce a contact heat resistance.

Liquid cooling module 33a comprises water distributing pump 35 for circulating coolant liquid 31; first heat exchanger 36a connected to an object to be cooled for receiving heat therefrom; reservoir tank 40 for guaranteeing a certain amount of the coolant liquid and accommodating variations in volume due to thermal expansion; and radiator 50 for cooling heated coolant liquid 31.

Water distributing pump 35 used herein, which forms part of liquid cooling module 33a, may be a centrifugal pump or a piezoelectric pump. Water distributing pump 35 is connected to first heat exchanger 36a through a pipe.

As illustrated in FIG. 10, first heat exchanger 36a is provided with first channel 55a formed therein for passing coolant liquid 31 therethrough. First channel 55a is formed such that coolant liquid 31, which has entered from an inlet port, sequentially flows through heat receiving surfaces 56a positioned in opposition to the respective color liquid crystal panels.

Radiator 50 is disposed at a location downstream of first heat exchanger 36a. Radiator 50 comprises heat sink 53 and air cooling fan 54. Heat sink 53 has a radiator internal channel (not shown) formed therein for passing coolant liquid 31 therethrough, and is also formed with a number of fins extending therefrom. Air cooling fan 54 is positioned near the fins for promoting the cooling of coolant liquid 31.

Reservoir tank 40 is disposed at a location downstream of radiator 50. Reservoir tank 40 compensates for a loss of the coolant liquid due to a coolant leak (evaporation) from holes of fibers of resin pipes used at pipe connections, and accommodates variations in volume of coolant liquid 31 due to thermal expansion to prevent damages to the pipe, lowered liquid feeding capabilities of water distributing pump 35 due to the introduction of air bubble, and clogging of the pipe. Reservoir tank 40 has an outlet port connected to water distributing pump 35 to form a closed loop as a whole. The position of reservoir tank 40 is not limited to a location downstream of radiator 50, but may be determined as appropriate in consideration of the overall layout.

For coolant liquid 31, a anti-freeze solution is preferably used, such as propylene alcohol, propylene glycol, and the like.

Next, description will be made on the cooling operation of liquid crystal unit 23.

Liquid crystal unit 23 integrally held by first holder member 34a generates heat through absorption of transmitted light in operation. The generated heat is transferred to first holder member 34a through holding member 51a. The sources of the heat are incident side polarizing plates 18a, 18b, 18c, exit side polarizing plates 19a, 19b, 19c, and liquid crystal panels 17a, 17b, 17c, and heat generated by these components is collectively transferred to first holder member 34a.

On the other hand, coolant liquid 31 is fed to first heat exchanger 36a by water distributing pump 35. Coolant liquid 31 dissipates the heat generated in liquid crystal unit 23 through first holder member 34a within first heat exchanger 36a. More specifically, heat transferred from liquid crystal unit 23 to first holder member 34a is transported from the surface of first heat exchanger 36a to coolant liquid 31 through heat receiving surface 56a. Coolant liquid 31, which is heated through heat exchange, is exhausted from the outlet port of first heat exchanger 36a, and fed to radiator 50. As coolant liquid 31 circulates along the internal channel within radiator 50, coolant liquid 31 is cooled down by heat sink 53 and air cooling fan 54, and returns to water distribution pump 35 via reservoir tank 40. The foregoing actions are repeated to eventually emit the heat generated in liquid crystal unit 34 to the atmosphere through coolant liquid 31.

While the temperature of coolant liquid 31 depends on the outside air temperature, an example is shown below. For example, when the outside air temperature is 30° C., coolant liquid 31 is normally at about 40° C. when it flows into first heat exchanger 36a, and is heated to as high as 50° C. to 60° C., after it has received the heat, depending on the amount of heat generated by liquid crystal unit 23. Coolant liquid 31 radiates the heat through radiator 50, and cools down substantially to the outside air temperature (35-40° C. depending on the capacity of radiator 50). The temperature on the heat receiving surface 56a of first heat exchanger 36a is approximately 40° C., though it depends on the temperature of coolant liquid 31.

As described above, since the liquid projector apparatus of this embodiment employs a liquid cooling scheme, it does not suffer a degraded image quality due to dust particles, which can cause a problem in an air cooling scheme. Also, the liquid projector apparatus of this embodiment is advantageous in providing silenced operation because it requires only a small fan. Further, since the cooling structure is disposed independently of the liquid crystal unit, the liquid crystal projector apparatus of this embodiment can provide images of high quality because the functions of the liquid crystal unit is less affected by the cooling structure.

Figure 11A:
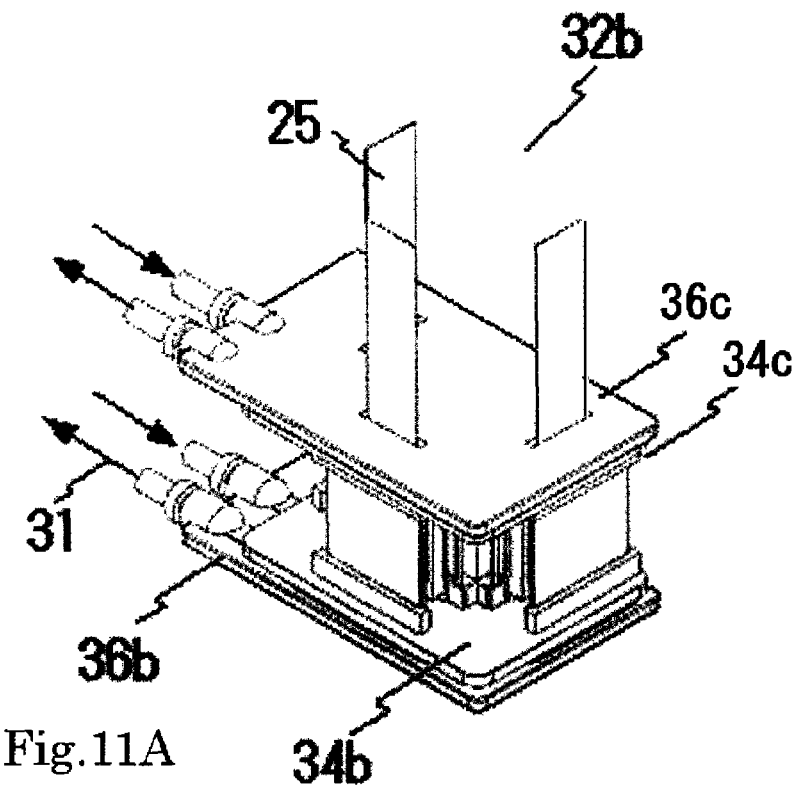
FIGS. 11A, 11B are perspective views each illustrating part of a liquid crystal unit and a liquid crystal cooling system in a liquid crystal projector apparatus according to a second embodiment of the present invention.
Figure 11B:
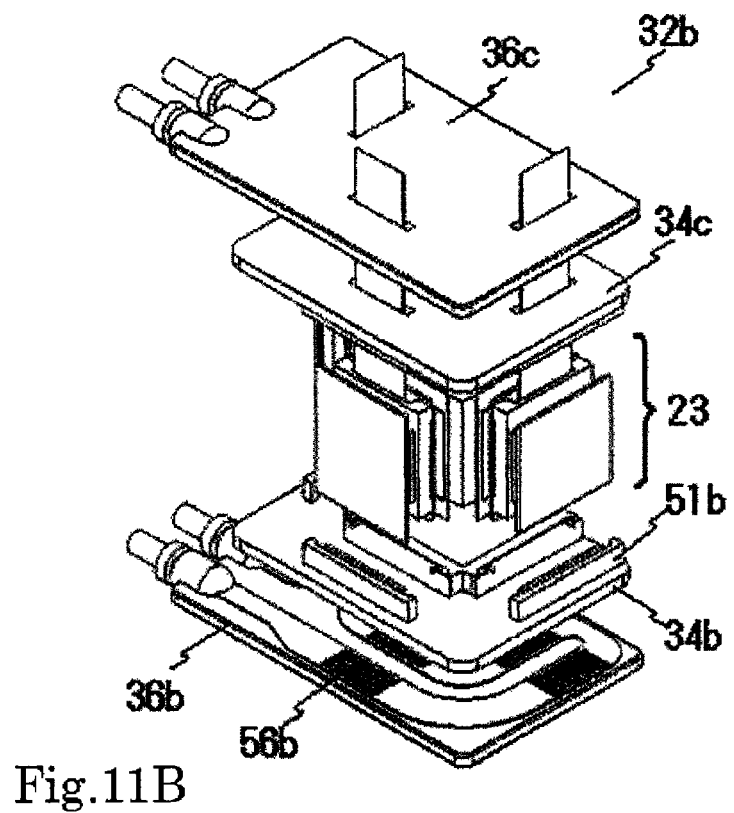
Figure 12:
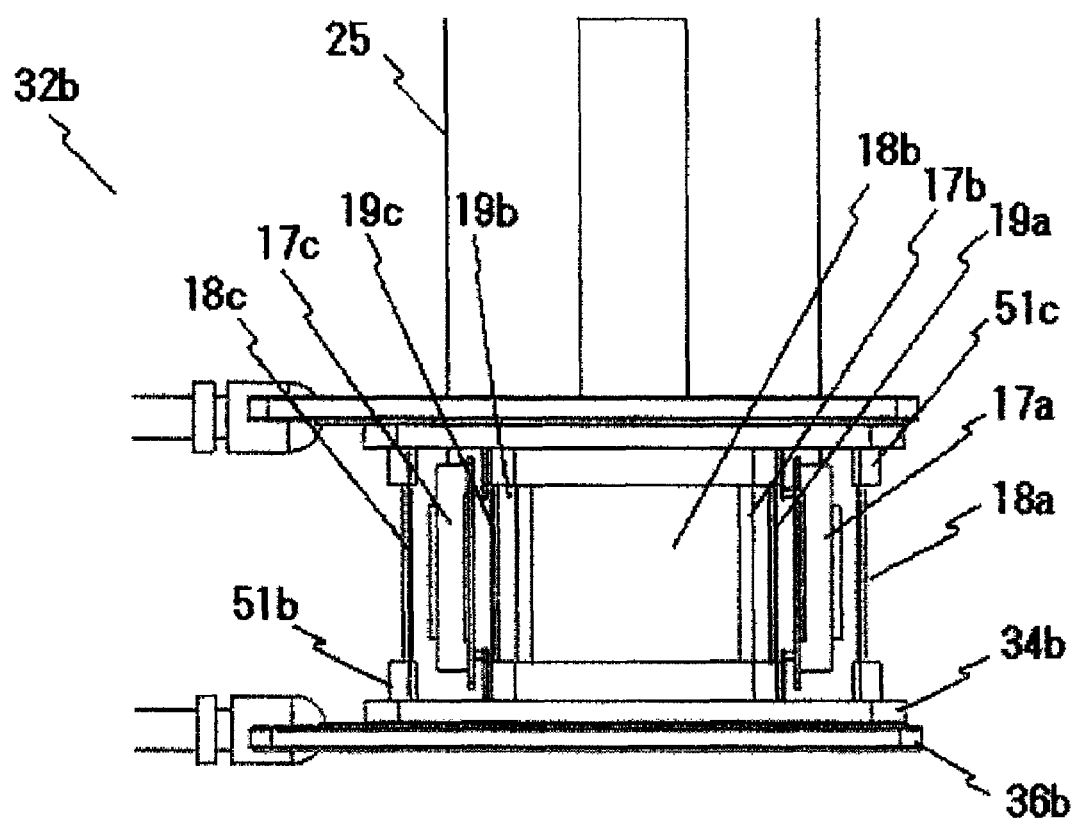
FIG. 12 is a front view of the liquid crystal unit and liquid crystal unit cooling system of the liquid crystal projector apparatus illustrated in FIGS. 11A, 11B.

Next, a liquid crystal projector apparatus according to a second embodiment of the present invention will be described with reference to FIGS. 11A, 11B, 12. FIGS. 11A, 11B are perspective views each illustrating part of a liquid crystal unit and a liquid crystal unit cooling system in a liquid crystal projector apparatus according to the second embodiment of the present invention. FIG. 11A is a perspective view of an assembled liquid crystal unit cooling system, and FIG. 11B illustrates an exploded perspective view of the liquid crystal unit cooling system. FIG. 12 is a front view of the liquid crystal unit and liquid crystal unit cooling system in the liquid crystal projector apparatus illustrated in FIGS. 11A, 11B.

Liquid crystal unit cooling system 32b in the liquid crystal projector apparatus according to the second embodiment differs from the first embodiment in that a pair of holder member and heat exchangers are disposed on the upper and lower sides of the liquid crystal unit, and is similar to the first embodiment in the remaining aspects.

First holder member 34b and second holder member 34c are disposed, respectively on the lower and upper sides of liquid crystal unit 23. First holder member 34b and second holder member 34c are connected to first heat exchanger 36b and second heat exchanger 36c, respectively. First holder member 34b, second holder member 34c, first heat exchanger 36b, and second heat exchanger 36c are similar in structure to first holder member 34a and first heat exchanger 36a, respectively, illustrated in the first embodiment. Liquid crystal unit 23 is securely held by similar holding mechanisms 51b, 51c, and first holder member 34b and second holder member 34c are thermally connected to first heat exchanger 36b and second heat exchanger 36c, respectively. A piping configuration for connecting first heat exchanger 36b and second heat exchanger 36c to water distributing pump 35 and radiator 50 is also modified from the first embodiment, though not shown. The rest of the structure in the second embodiment is similar to the first embodiment, and second heat exchanger 36c is also provided with a second channel (not shown) formed therein, similar to that in first heat exchanger 36b. In FIGS. 11A, 11B, FPC 25 extends through second holder member 34c and second heat exchanger 36c, the reason for which will be described later in connection with a fourth embodiment.

With the foregoing structure, heat generated in liquid crystal unit 23 is transferred to first holder member 34b and second holder member 34c through holding structures 51b, 51c, and is dissipated by a pair of first heat exchanger 36b and second heat exchanger 36c through heat receiving surfaces 56b and 56c (not shown).

By thus cooling the liquid crystal unit simultaneously from the upper and lower sides, the liquid crystal projector apparatus can further improve the liquid crystal unit cooling capabilities to keep the liquid crystal unit at a low temperature, and can substantially uniformly maintain temperature distributions on optically transparent surfaces of the liquid crystal panels and polarizing plates to accomplish a high quality of projected images with less color shading.

Figure 13:
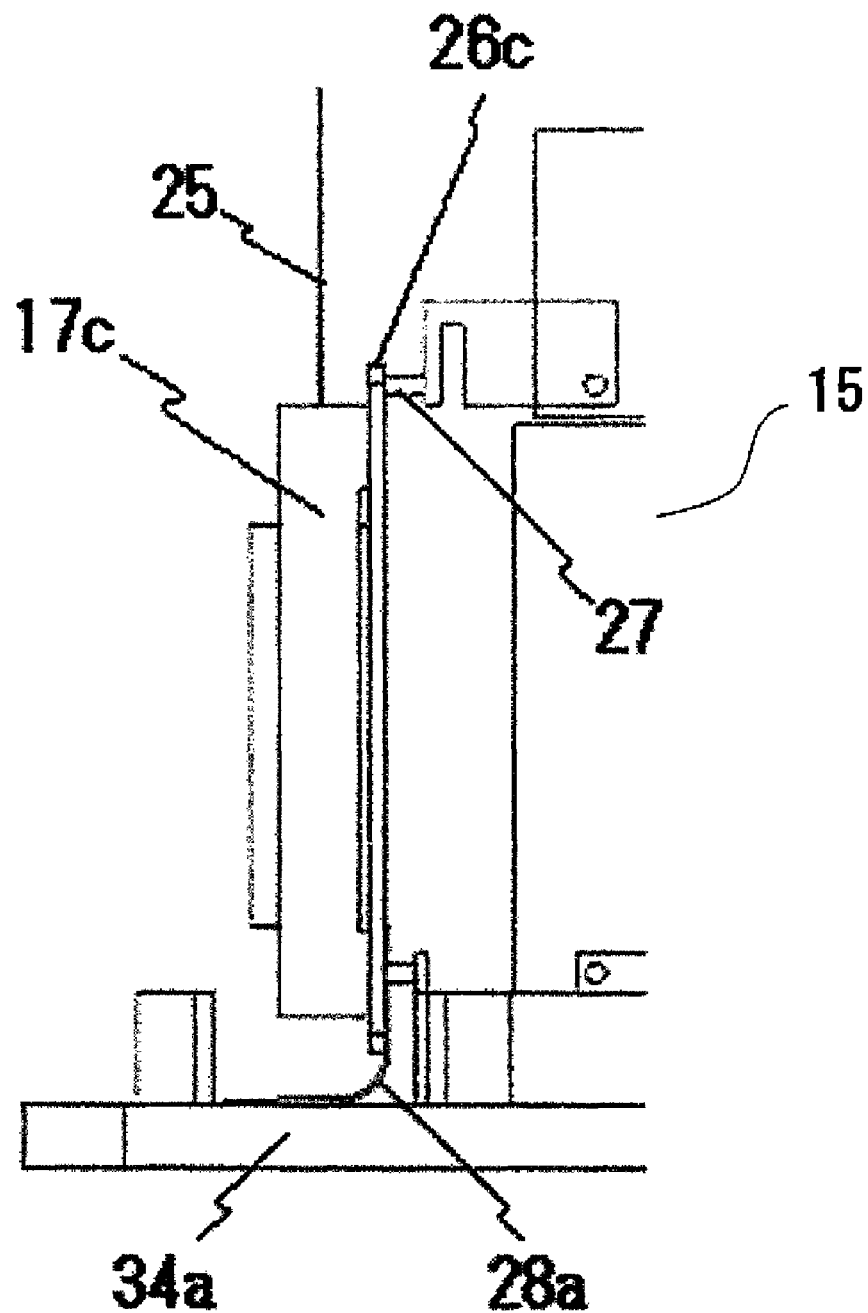
FIG. 13 is a side view illustrating part of a liquid crystal unit in a liquid crystal projector apparatus according to a third embodiment of the present invention.

Next, a liquid crystal projector apparatus according to a third embodiment of the present invention will be described with reference to FIG. 13. FIG. 13 is a side view illustrating part of a liquid crystal unit in a liquid crystal projector apparatus according to the third embodiment of the present invention. It should be understood that the following description is made in connection with liquid crystal panel 17c for blue light, given as an example, but can be applied to liquid crystal panels of the other colors.

As described in "Description of the Related Art," liquid crystal projector apparatuses are often provided with an adjusting mechanism (optical axis adjustment) for adjusting a liquid crystal panel, which forms part of a liquid crystal unit, in the vertical, horizontal, and rotating directions for adjusting the registration. The third embodiment can be applied to such a liquid crystal projector apparatus. As illustrated in FIG. 13, liquid crystal panel 17c is supported at a distance from color combiner prism 15. Liquid crystal panel 17c is securely held by fixture 26c, and fixture 26c is supported by holder protrusions 27 at four points, i.e., at four corners thereof, and securely adhered after the optical axis has been adjusted.

The third embodiment is characterized in that thermally conductive flexible sheet 28a is applied to fixture 26 to which liquid crystal panel 17c is fixed, a distal end of thermally conductive flexible sheet 28a is connected to first holder member 34a. Thermally conductive sheet 28a can be made, for example, of a one-side adhesive graphite sheet of approximately 100 μm thick.

With the foregoing structure, liquid crystal panel 17c can be thermally connected to and cooled down by first holder member 34a which has a heat absorbing function, without affecting a posture in which liquid crystal panel 17c is fixed in the air. In other words, the heat can be efficiently absorbed by first holder member 34a without damaging the alignment of liquid crystal panel 17c, thus resulting in improved capabilities of cooling liquid crystal panel 17c, a limited panel temperature, and a longer lifetime. Also, the temperature distribution on the panel surface is made uniform to help improve the quality of projected images.

Figure 14A:
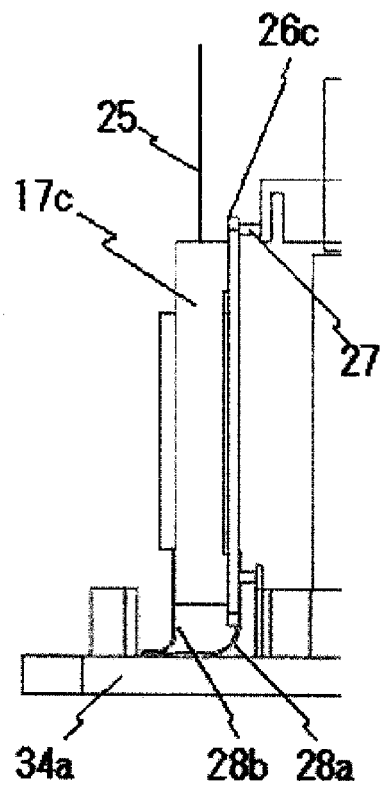
FIGS. 14A, 14B are side views each illustrating part of a liquid crystal unit in the liquid crystal projector apparatus according to the third embodiment of the present invention.
Figure 14B:
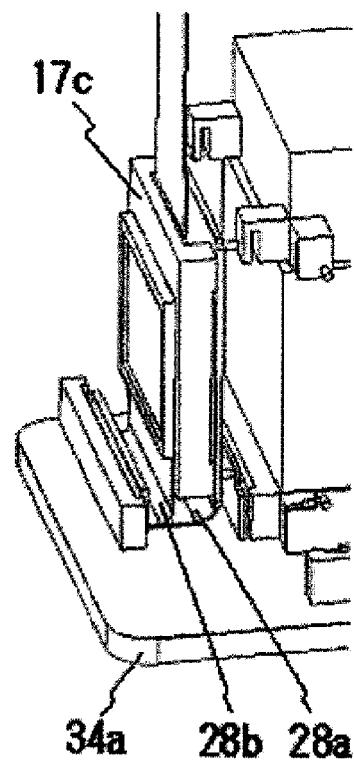

The third embodiment is not limited to the one illustrated in FIG. 13, but thermally conductive flexible sheets 28a, 28b, similar to that shown in FIG. 13 may be applied to the front and rear surfaces (incident side and exit side) of liquid crystal panel 17c, for example, as illustrated in FIGS. 14A, 14B. Here, FIG. 14A is a side view illustrating a part of the liquid crystal panel extracted from the liquid crystal projector apparatus, and FIG. 14B is a perspective view illustrating part of the liquid crystal panel. The embodiment illustrated in FIGS. 14A, 14B can more effectively cool down liquid crystal panel 17c particularly when liquid crystal panel 17c has a remarkable temperature gradient in the thickness direction, because the heat can be absorbed from the front and back surface of liquid crystal panel 17C. Also, the thermally conductive sheets may be disposed to connect to second holder member 34c on the upper side of liquid crystal unit 23, as previously described in the second embodiment.

Figure 15A:
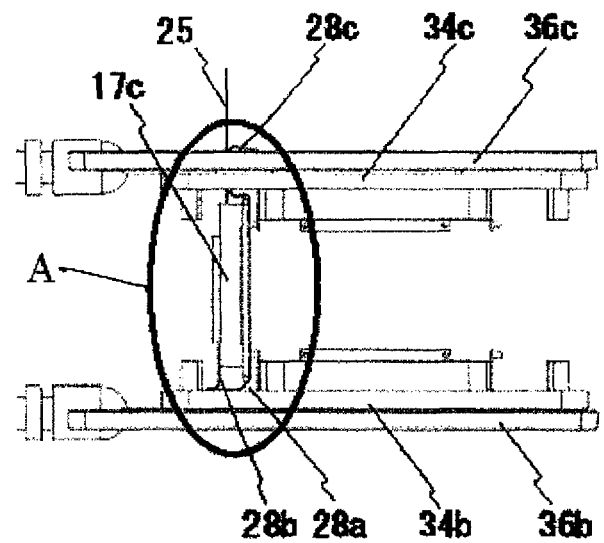
FIGS. 15A-15C are a side view, an enlarged side view, and a perspective view, respectively, illustrating part of a liquid crystal unit in a liquid crystal projector apparatus according to a fourth embodiment of the present invention.
Figure 15B:
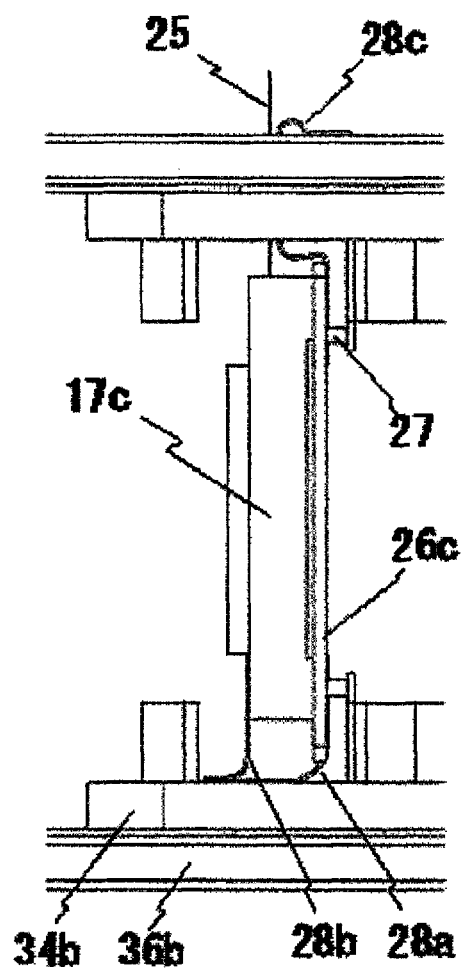
Figure 15C:
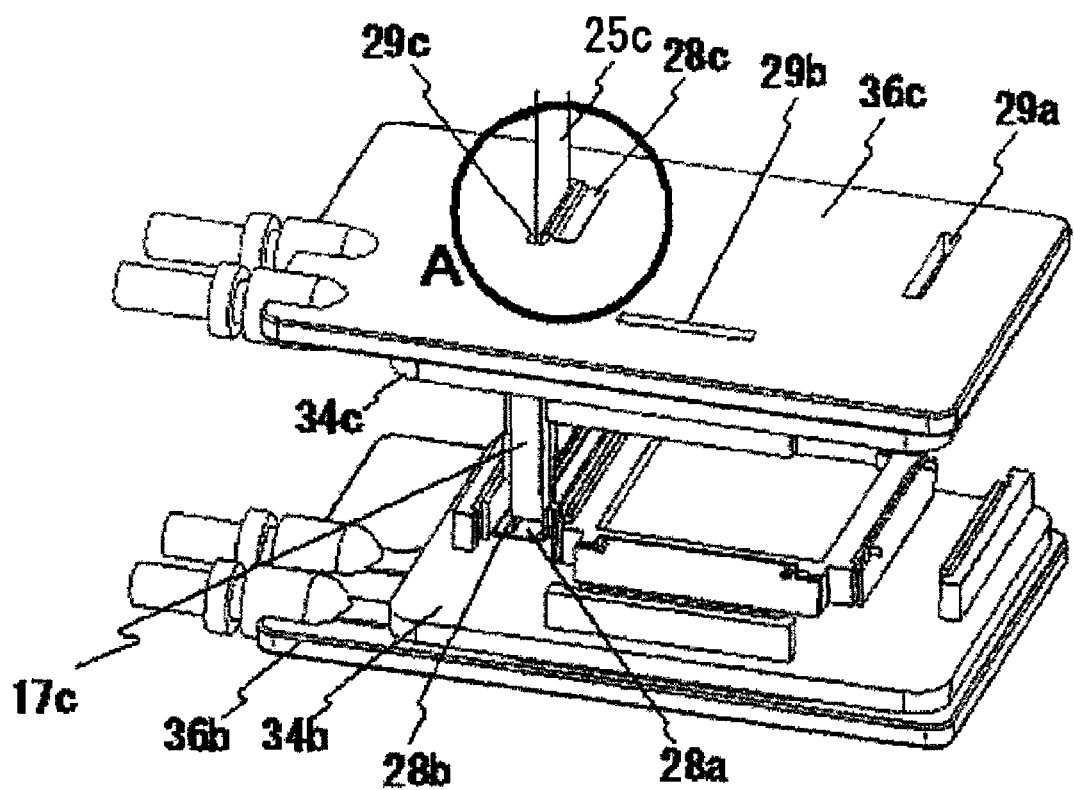
Figure 16A:
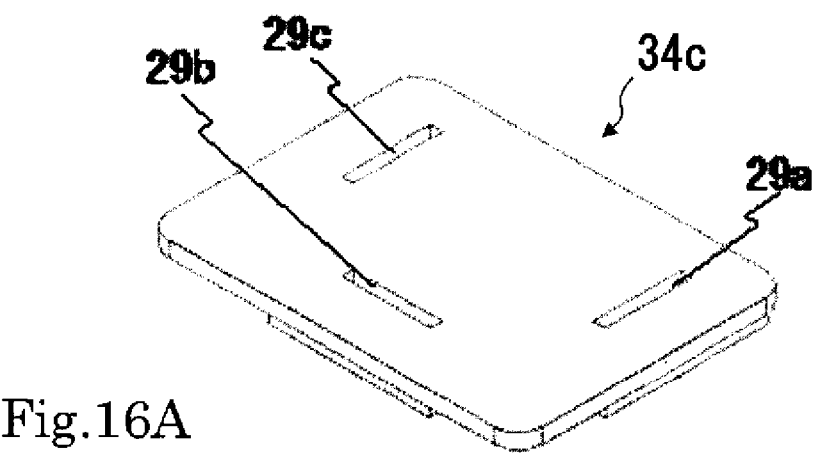
FIGS. 16A-16C are diagrams illustrating the configuration of a holder member in the liquid crystal projector apparatus according to the fourth embodiment of the present invention.
Figure 16B:
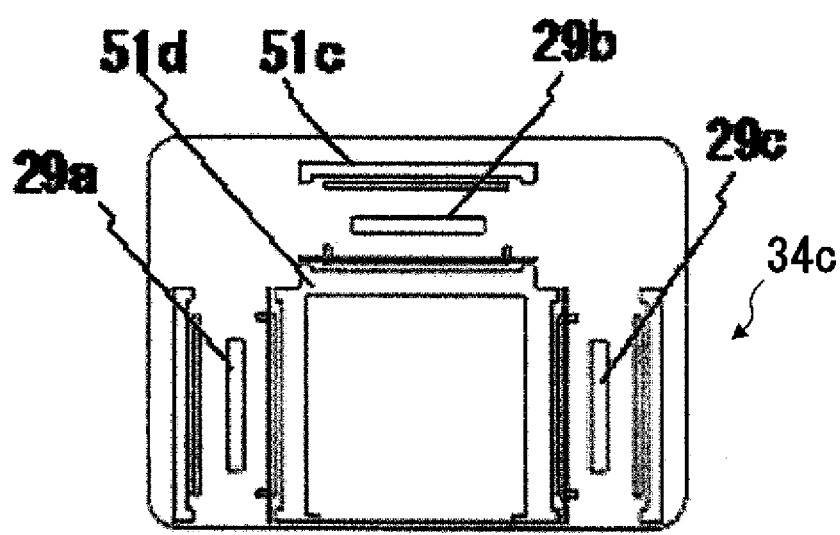
Figure 16C:
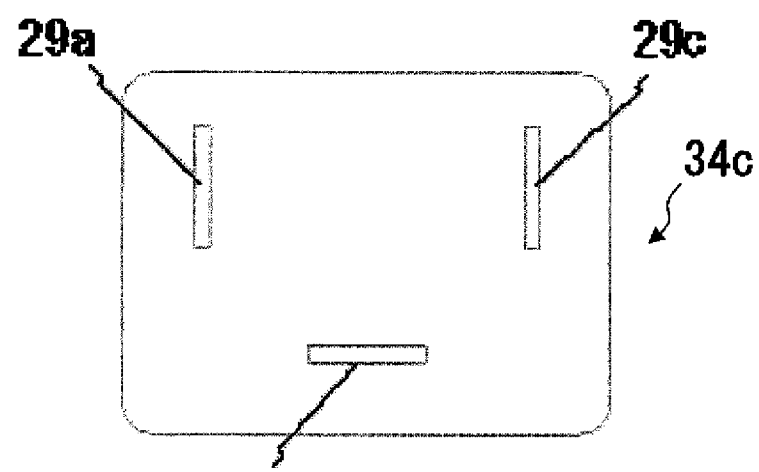
Figure 17A:
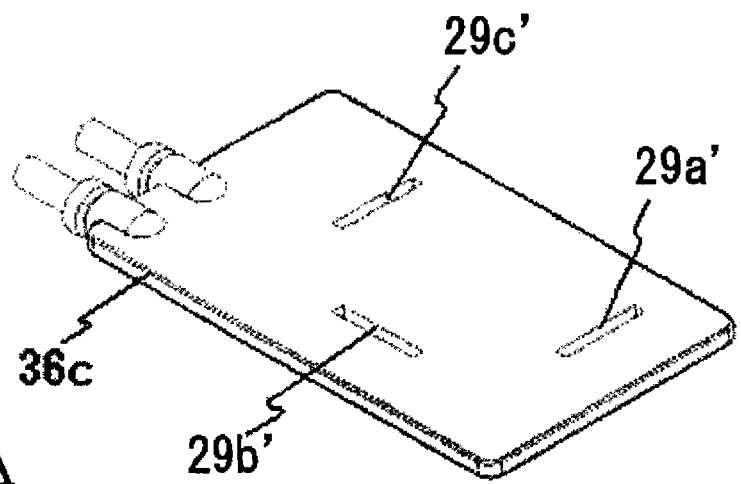
FIGS. 17A-17C are diagrams illustrating the configuration of a heat exchanger in the liquid crystal projector apparatus according to the fourth embodiment of the present invention.
Figure 17B:
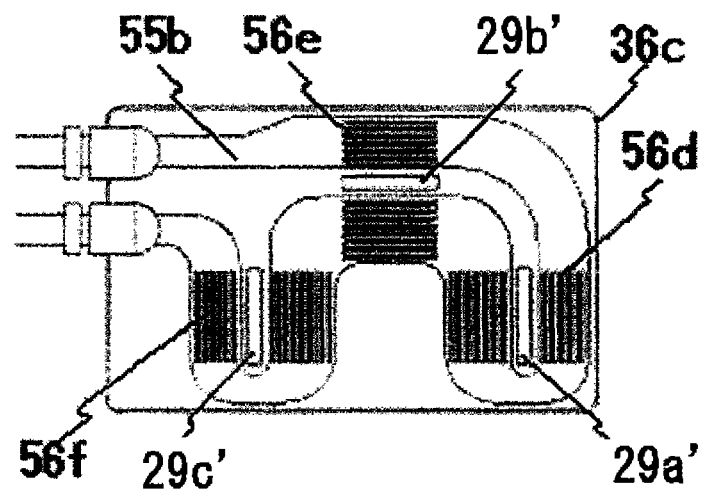
Figure 17C:
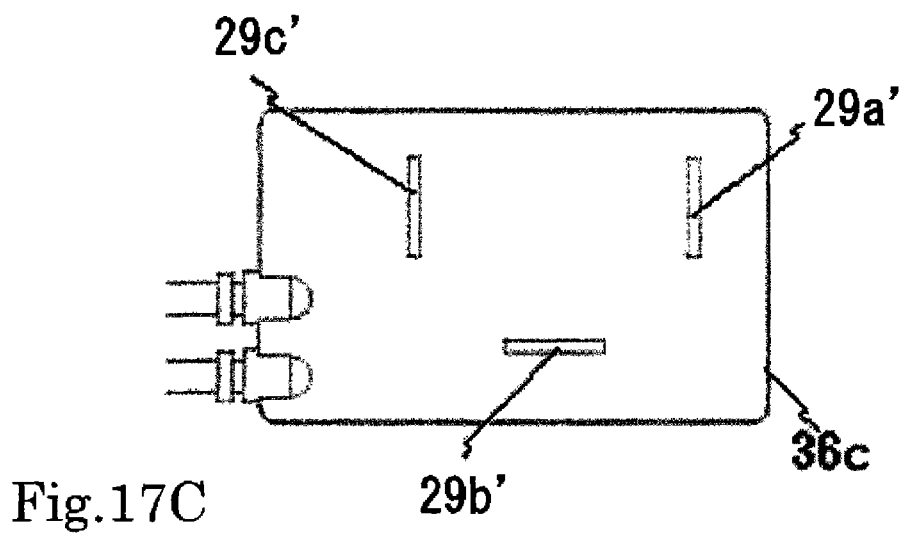

Next, a liquid crystal projector apparatus according to a fourth embodiment of the present invention will be described with reference to FIGS. 15A-17C. The fourth embodiment is applied in combination with the second embodiment described above. FIG. 15A is a side view illustrating part of a liquid crystal unit according to the fourth embodiment, and FIG. 15B is a partially enlarged side view of part indicated by A in FIG. 15A. FIG. 15C is a perspective view illustrating part of the liquid crystal unit and liquid crystal unit cooling system according to the fourth embodiment. FIGS. 16A-16C illustrate a full view of a holder member, while FIGS. 17A-17C illustrate a full view of a heat exchanger. Specifically, FIGS. 16A, 17A illustrate perspective views taken from the upper surface; FIGS. 16B, 17B back views; and FIGS. 16C, 17C top plan views, respectively.

In FIGS. 15A, 15B, thermally conductive flexible sheets 28a, 28b are each applied to a lower portion of the front or back surface of liquid crystal panel 17c. Simultaneously, thermally conductive sheet 28c is also applied to an upper portion of one surface of liquid crystal panel 17c. Thermally conductive sheets 28a, 28b have their distal ends connected to first holder member 34b, while thermally conductive sheet 28c has its distal end connected to second holder member 34c.

As illustrated in FIGS. 16A-16C, in a pair of holder members for holding liquid crystal unit 23 from above and from below, second holder member 34c, to which FPCs 25a, 25b, 25c extends, is formed with through holes 29a, 29b, 29c at positions at which FPCs 25a, 25b, 25c extend through second holder member 34c. Also, as illustrated in FIGS. 17A-17C, in a pair of the upper and lower heat exchangers, second heat exchanger 36c, to which FPCs 25a, 25b, 25c extend, is formed with throughholes 29a', 29b', 29c' at positions at which FPCs 25a, 25b, 25c extend through second heat exchanger 36c. As illustrated in portion A in FIG. 15C, FPCs 25a, 25b, 25c extend upward through these throughholes (only FPC 25c is shown in FIG. 15C).

Thermally conductive sheet 28c on the upper side of liquid crystal unit 23 is once guided upward from FPC throughholes 29c, 29c', which extend through holder member 34c and second heat exchanger 36c, respectively, and is connected to the upper surface (on the back side when viewed from liquid crystal unit 23) of second heat exchanger 36c.

FIG. 17B illustrates the channel arrangement in a jacket. Since the channel of second heat exchanger 36c is formed to avoid interference with the respective FPC throughholes, the channels of first lower heat exchanger 36b and second upper heat exchanger 36c are not routed in mirror symmetry. In other words, as is apparent from a comparison with FIG. 10, the upper and lower heat exchangers differ in the rooting of channel from each other.

While thermally conductive sheet 28c on the upper surface is applied only on the exit surface of the liquid crystal panel, it should be understood that thermally conductive sheet 28c can be applied on the incident surface of the liquid crystal panel in a manner similar to thermally conductive sheet 28b on the lower surface.

In this way, even when FPC 25 projects upward, FPC 25 can be connected to an external control board (not shown) without interfering with the holder member or heat exchangers. When thermally conductive sheet 28c does not interfere with FPC 25, thermally conductive sheet 28c may be connected directly to second holder member 34c, without extending a throughhole.

Figure 18A:
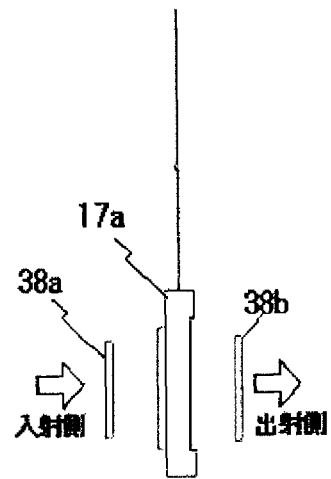
FIGS. 18A-18C are diagrams illustrating the configuration of a liquid crystal panel in a liquid crystal projector apparatus according to a fifth embodiment of the present invention.
Figure 18B:
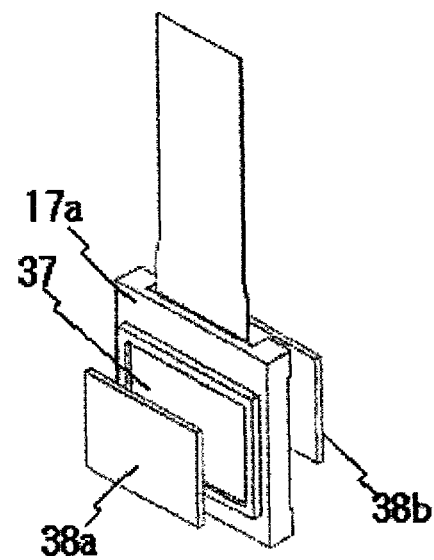
Figure 18C:
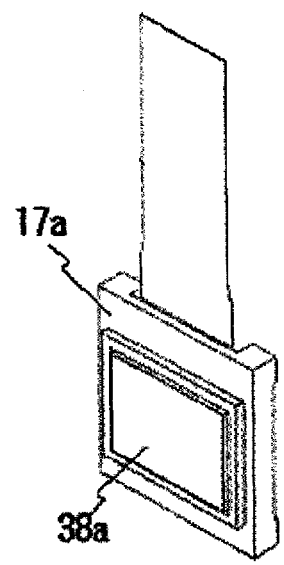

Next, a liquid crystal projector apparatus according to a fifth embodiment of the present invention will be described with reference to FIGS. 18A-18C. FIGS. 18A-18C illustrate a liquid crystal panel in the liquid crystal projector apparatus according to the fifth embodiment, wherein FIG. 18A is a side view of the liquid crystal panel before a transparent thin plate member is attached; FIG. 18B is a perspective view of the liquid crystal panel illustrated in FIG. 18A; and FIG. 18C is a perspective view of the liquid crystal panel after the transparent thin plate member has been attached thereto. While the following description will be made on a liquid crystal panel 17a for red light, given as an example, it should be understood that the description can be applied to the liquid crystal panels of the other colors.

As illustrated in FIGS. 18A-18C, transparent thin plate members 38a, 38b, each having a thermal conductivity larger than panel component member 37 of liquid crystal panel 17a, are bonded on both of an incident side panel surface and an exit side panel surface of liquid crystal panel 17a which forms part of liquid crystal unit 23. The transparent thin plate member may be applied to only one of the incident and exit side panel surfaces.

Transparent thin plate members 38a, 38b may be members which excite a thermal diffusion on the panel surfaces of liquid crystal panel 17a, i.e., transparent members having a higher thermal conductivity than panel component member 37 from a viewpoint of thermal characteristics. Conventionally, when a heat dissipating plate having a high thermal conductivity is bonded to a liquid crystal panel for improving the cooling capabilities of the liquid crystal panel itself, the heat dissipating plate is limited to a sapphire substrate, which is disadvantageous in cost. This embodiment can utilize, for example, a quartz substrate which has a high thermal conductivity and good workability, and is less expensive than the sapphire substrate. Alternatively, any other transparent sheet member may be utilized on the condition that it provides predetermined thermal characteristics.

Since the transparent thin plate members 38a, 38b contribute to an increased thermal diffusion on the panel surfaces, and to a more averaged temperature distribution within the panel surfaces of liquid crystal panel 17a, a maximum temperature can be reduced within the panel surfaces of the liquid crystal panel 17a to suppress local temperature rises. Furthermore, the temperature on the outer periphery of the panel surface of liquid crystal panel 17a rises due to the thermal diffusion to increase a difference in temperature between liquid crystal panel 17a and first holder member 34a, thus further promoting the heat exchange between the outer periphery of liquid crystal panel 17a and first holder member 34a to reduce an average temperature of liquid crystal panel 17a as well. The thermally conductive flexible sheet detailed in the third embodiment may be attached around the panel surface such that the heat is absorbed by the holder member, to provide similar advantages.

Figure 19A:
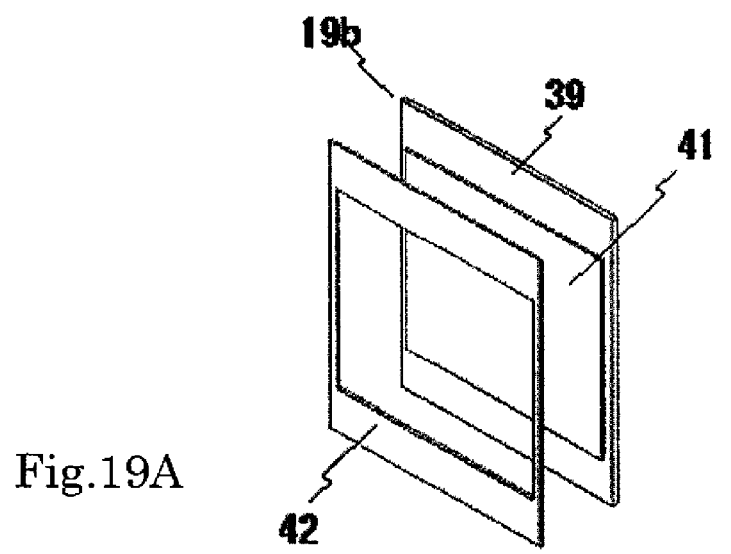
FIGS. 19A-19C are diagrams illustrating the configuration of an exit side polarizing plate for use in a liquid crystal projector apparatus according to a sixth embodiment of the present invention.
Figure 19B:
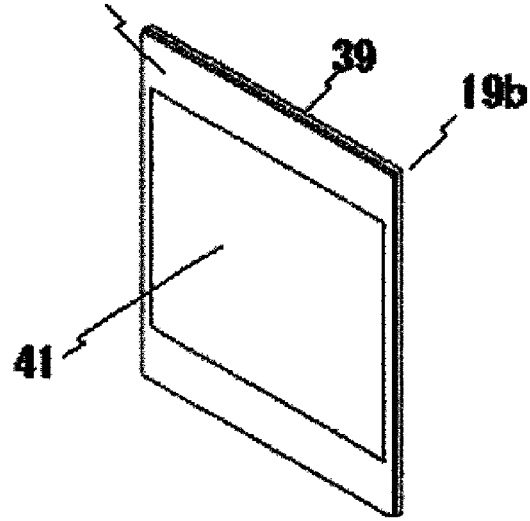
Figure 19C:
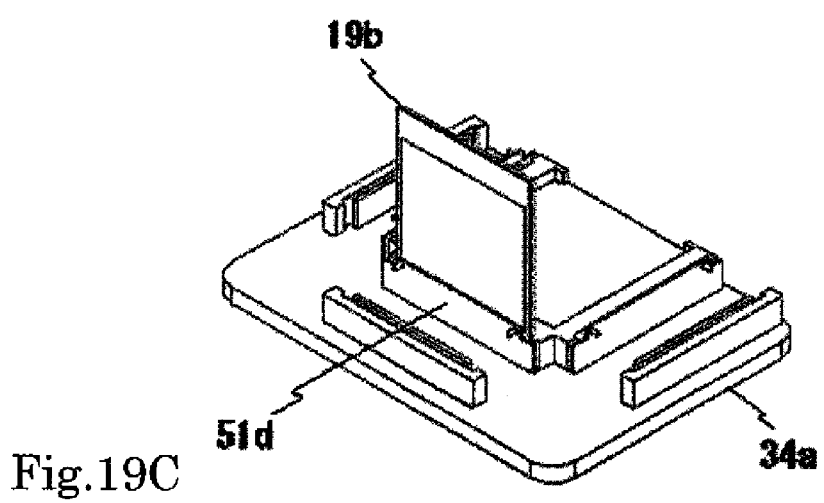

Next, a liquid crystal projector apparatus according to a sixth embodiment of the present invention will be described with reference to FIGS. 19A-19C. FIGS. 19A-19C illustrate an exit side polarizing plate of the liquid crystal projector apparatus according to the sixth embodiment, wherein FIG. 19A is a perspective view of the exit side polarizing plate before a sheet member is attached thereto; FIG. 19B a perspective view of the exit side polarizing plate after the sheet member has been attached thereto; and FIG. 19C a perspective view of the exit side polarizing plate when it is mounted on a holder member. While the following description will be made on exit side polarizing plate 19b for green light, given as an example, it should be understood that the description can also be applied to the exit side polarizing plates of the other colors and incident side polarizing plates.

Exit side polarizing plate 19b is comprised of glass substrate 39 and polarizing film 41. Polarizing film 41 is adhered to a central region of glass substrate 39, such that an outer peripheral region of glass substrate 39 lacks polarizing film 41. Sheet member 42 having a thermal conductivity larger than glass substrate 39 is applied to the outer peripheral region of glass substrate 39 lacking polarizing film 41. Sheet member 42 used herein may be, for example, a single-side adhesive thermally conductive sheet such as a graphite sheet illustrated in the third embodiment. Since sheet member 42 is adhered around polarizing film 41, it need not be transparent but preferably does not excite stray light. Also, while sheet member 42 may be adhered on either the incident side surface or exit side surface of exit side polarizing plate 19b, sheet member 42 is preferably adhered to the side that is pressed against holding mechanism 51d of first holder member 34a.

Thus, similar to the fifth embodiment, the exit side polarizing plate of the sixth embodiment contributes to improved thermal diffusion performance on the surface of glass substrate 39, an averaged temperature distribution within the surface of glass substrate 39 including polarizing film 41, and a reduction in a maximum temperature of polarizing film 41. Also, since the temperature rises around polarizing film 41, i.e., in the outer peripheral region of glass substrate 39, to which sheet member 42 has been adhered, this rise in temperature promotes the absorption of heat to first holder member 34a through holding mechanism 51d. Moreover, since sheet member 42 adhered around polarizing film 41 intervenes on the surface of polarizing plate 19b connected to holding mechanism 51d, a contact thermal resistance is reduced between exit side polarizing plate 19b and first holder member 34a, thus further improving the heat absorption efficiency. Consequently, an average temperature of polarizing film 41 also becomes lower to further prolong the lifetime of the polarizing plate.

Figure 20:
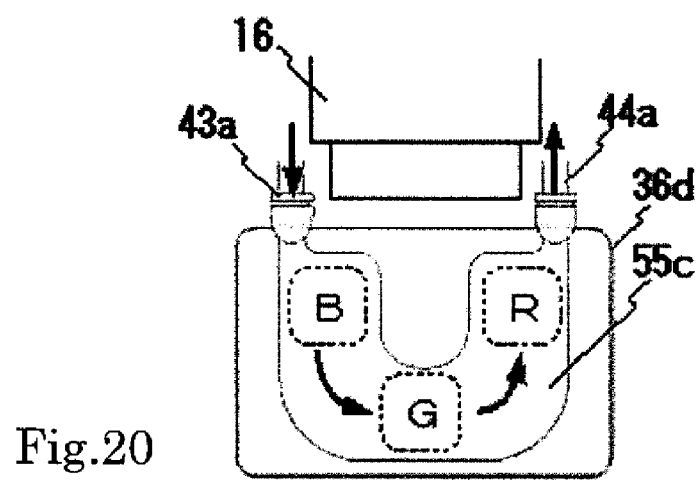
FIG. 20 is a plan view illustrating the internal structure of a heat exchanger in a liquid crystal projector apparatus according to a seventh embodiment of the present invention.

Next, a liquid crystal projector apparatus according to a seventh embodiment of the present invention will be described with reference to FIG. 20. FIG. 20 is a plan view illustrating the internal structure of a heat exchanger in a liquid crystal projector apparatus according to the seventh embodiment of the present invention.

First heat exchanger 36d in this embodiment has inlet port 43a and outlet port 44a of first channel 55c both positioned closer to projection lens 16, and U-shaped first channel 55c formed with inlet port 43a positioned closer to a blue light liquid crystal panel (labeled B in FIG. 20) and outlet port 44a positioned closer to a red light liquid crystal panel (labeled R in FIG. 20) (in the following description on the seventh embodiment, the liquid crystal panel includes an incident side polarizing plate and an exit side polarizing plate). A green light liquid crystal panel (labeled G in FIG. 20) is positioned halfway between the red and blue light liquid crystal panels. Consequently, the liquid crystal panels are cooled down as a whole in the order of the blue, green, and red light liquid crystal panels.

The channel is routed in the foregoing manner for the reason set forth below. Since light energy is generally stronger at a shorter wavelength, in a light modulator in a three-plate type liquid crystal projector apparatus, the blue light optical element (polarizing plates and liquid crystal panels) tends to experience the largest heat caused by light absorbed by optical elements, the green light optical element tends to receive the next largest amount of light. Unbalanced temperature characteristics among the liquid crystal panels of the respective color light cause a change in operating speed characteristics of the liquid crystal materials, and also cause a degraded quality of images displayed at high speeds due to variations in display speed among R, G, B. Likewise, in regard to the polarizing plates, a unit replacement time (lifetime) is determined by the member which experiences the highest temperature, leading to a requirement for maintaining the temperature characteristics of the light modulators corresponding to the respective color lights as constant as possible. Bearing the foregoing in mind, in first heat exchanger 36d which connects a holder member mounted with liquid crystal unit 23, first channel 55c is routed such that coolant liquid 31 flows into first channel 55c from a position corresponding to the blue light liquid crystal panel, passes through a position corresponding to the green light liquid crystal panel, and finally flows out from a position corresponding to the red light liquid crystal panel to circulate to a liquid cooling module heat dissipator (not shown).

With first channel 55c thus routed, coolant liquid 31 at a low temperature is supplied to the blue light liquid crystal unit which is more heated immediately after it has been introduced into first channel 55c, and the red light liquid crystal unit, which generates a relatively small amount of heat is cooled by coolant liquid 31 at a higher temperature after it has received the heat, thereby taking the balance between the heat generation and cooling of the respective color liquid crystal units.

Figure 21:
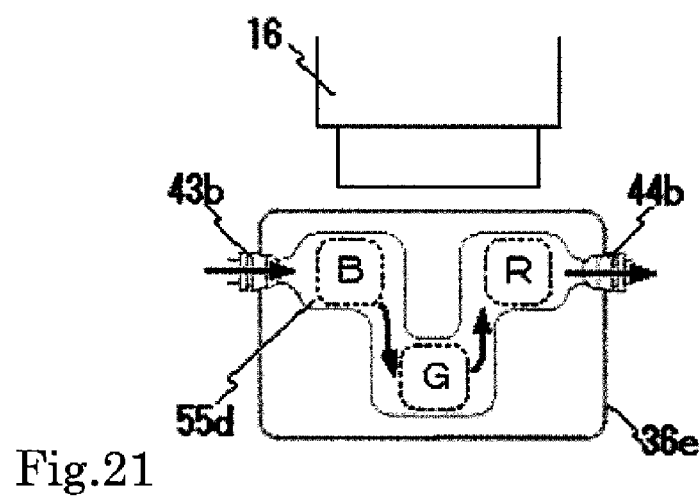
FIG. 21 is a plan view illustrating the internal structure of another heat exchanger in the liquid crystal projector apparatus according to the seventh embodiment of the present invention.

Alternatively, as illustrated in FIG. 21, inlet port 43b and outlet port 44b of first channel 55d may be disposed on the left and right sides of projection lens 16, wherein similarly, inlet port 43b is positioned closer to a blue liquid crystal panel (labeled B in FIG. 21), and outlet port 44b is positioned closer to a red liquid crystal panel (labeled R in FIG. 21) to form first channel 55d generally routed in T-shape.

Figure 22:
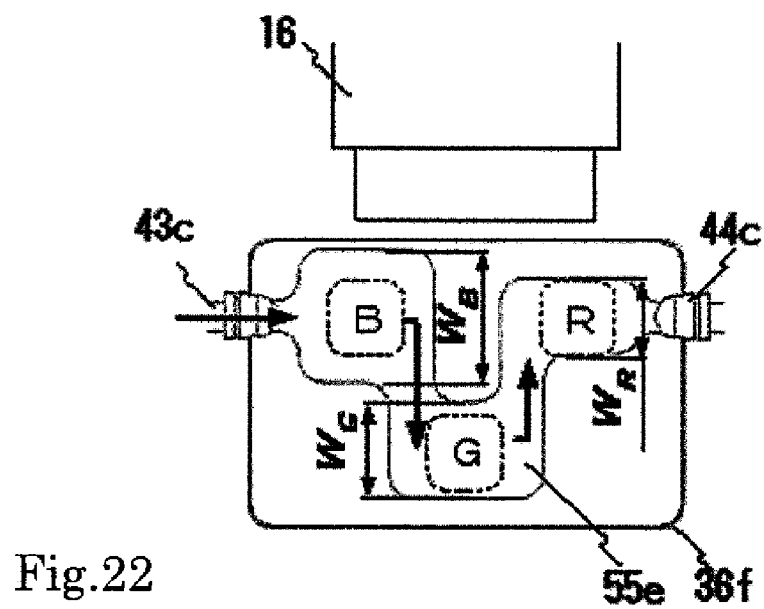
FIG. 22 is a plan view illustrating the internal structure of a further heat exchanger for the liquid crystal projector apparatus according to the seventh embodiment of the present invention.

Further alternatively, as illustrated in FIG. 22, first channel 55e may be routed such that its width is set widest (WB) at a position corresponding to a blue liquid crystal panel and incrementally narrower toward a position corresponding to a green liquid crystal panel (WG) and a position corresponding to a red liquid crystal panel (WR). Such a setting of the channel width is particularly effective when the liquid crystal units corresponding to the respective color light largely vary in the amount of heat generated thereby. The area of the coolant circulating channel (i.e., an area over which heat is absorbed by the coolant) is set wider at the position corresponding to the blue liquid crystal unit, which will reach a higher temperature, to allocate larger cooling capabilities (jacket heat receiving capabilities). The channel width ratio (WB:WG:WR) or channel area ratio is determined in accordance with a heat generation ratio of the liquid crystal panels of the respective color light.

The foregoing embodiment can be applied in a similar manner to second heat exchanger 36c disposed on the upper side of liquid crystal unit 23, described in the second embodiment.

Figure 23A:
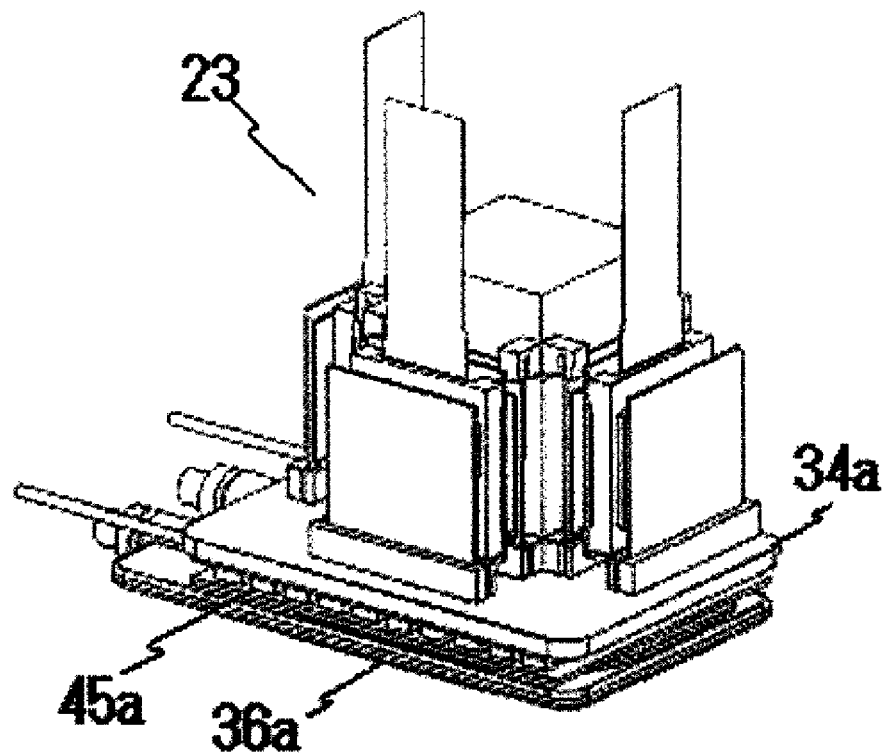
FIGS. 23A-23C are a perspective view, a side view, and an exploded perspective view, respectively, illustrating part of a liquid crystal unit and a liquid crystal unit cooling system in a liquid crystal projector apparatus according to an eighth embodiment of the present invention.
Figure 23B:
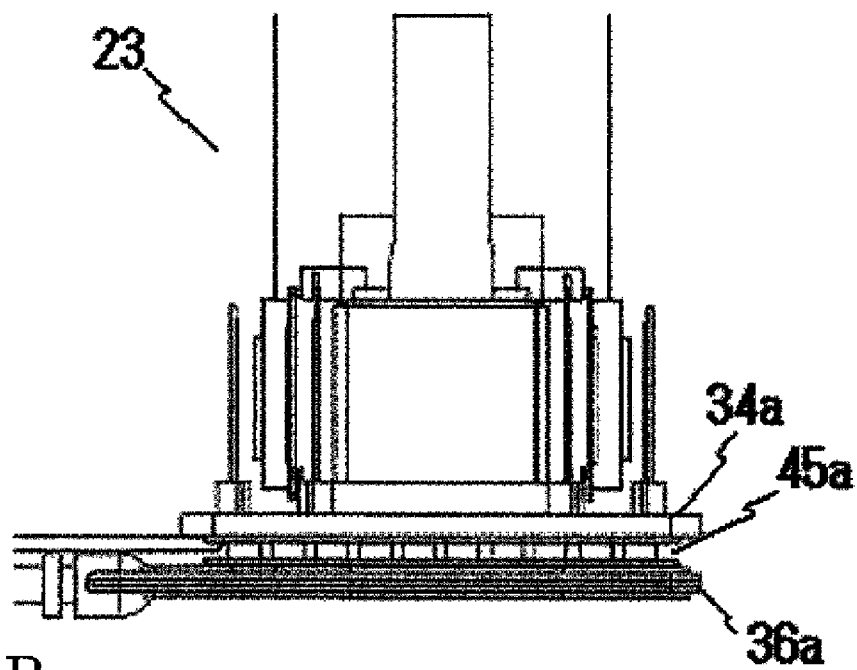
Figure 23C:
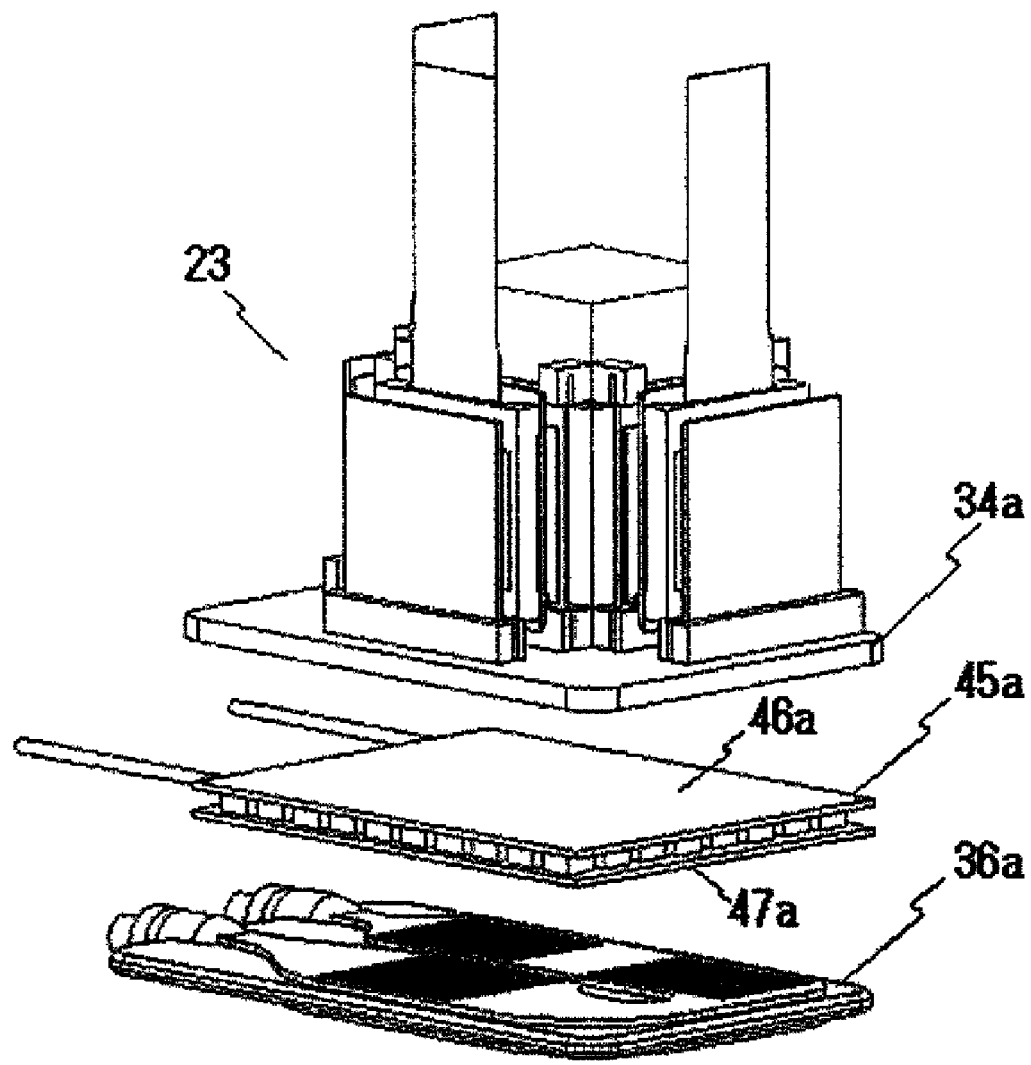

Next, a liquid crystal projector apparatus according to an eighth embodiment of the present invention will be described with reference to FIGS. 23A-23C. The liquid crystal projector apparatus according to the eighth embodiment can be applied when the liquid crystal units are cooled down to a room temperature or lower with the intention to further prolong the lifetime of the liquid crystal units. FIGS. 23A and 23B are a perspective view and a side view, respectively, illustrating part of the liquid crystal unit and liquid crystal unit cooling system in the liquid crystal projector apparatus according to the eighth embodiment. FIG. 23C in turn is an exploded perspective view of part of the liquid crystal unit and liquid crystal unit cooling system illustrated in FIG. 23A.

The eighth embodiment features in that Peltier element 45a is sandwiched between first holder member 34a for holding liquid crystal unit 23 and first heat exchanger 36a, with its lower temperature side directed to the surface of first holder member 34a. First holder member 34a connected to heat absorbing surface 46a of Peltier element 45a is cooled down to an outside air temperature or lower, while first heat exchanger 36a connected to heat generating surface 47a of Peltier element 45a receives heat generated by the thermoelectric element. Then, the heat of first heat exchanger 36a is eventually radiated by a radiator (not shown) of a liquid cooling module through coolant liquid 31.

The temperature on the heat absorbing surface of Peltier element 45a is preferably set within a temperature range (>dew point) in which no condensation occurs on the thermoelectric elements or optical elements, and countermeasures are preferably taken against condensation when liquid crystal unit 23 must be cooled down to a temperature below that temperature range. In addition, the temperature on the heat generating surface of Peltier element 45a is preferably set at the boiling point of coolant liquid 31 or lower (120° C.).

Generally, a liquid crystal unit cooling structure cannot cool down the temperature of a heat exchanger to an outside air temperature or lower due to a heat transportation process of a liquid cooling module. As described above, the temperature on the heat receiving surface of the heat exchanger can be cooled down to approximately 40° C., for example, when the outside air temperature is 30° C., and the temperature of liquid crystal unit 23 is dominated by this jacket surface temperature. However, the use of the Peltier element enables liquid crystal unit 23 to be cooled down to the outside air temperature or lower.

Figure 24A:
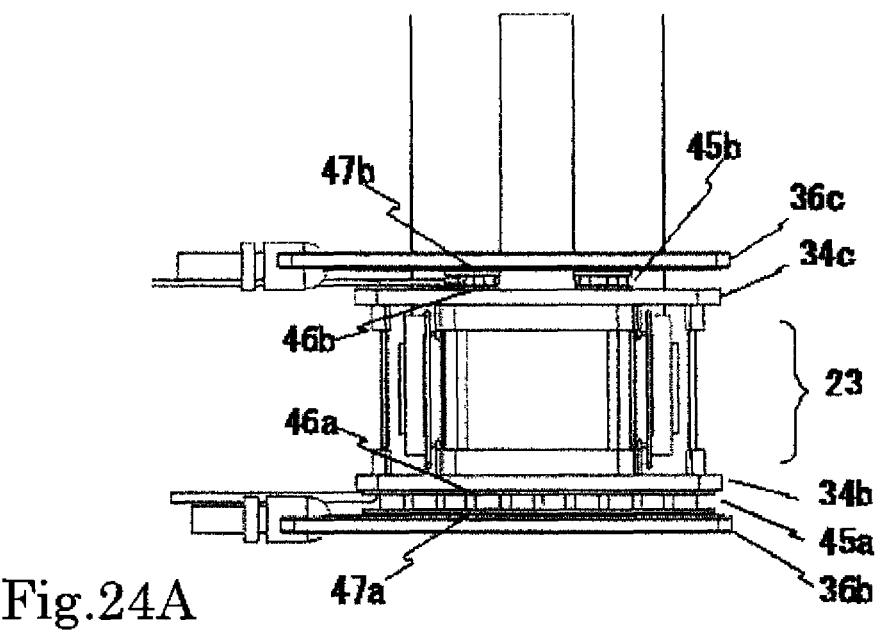
FIGS. 24A, 24B are perspective views each illustrating part of the liquid crystal unit and liquid crystal unit cooling system in the liquid crystal projector apparatus according to the eighth embodiment of the present invention.
Figure 24B:
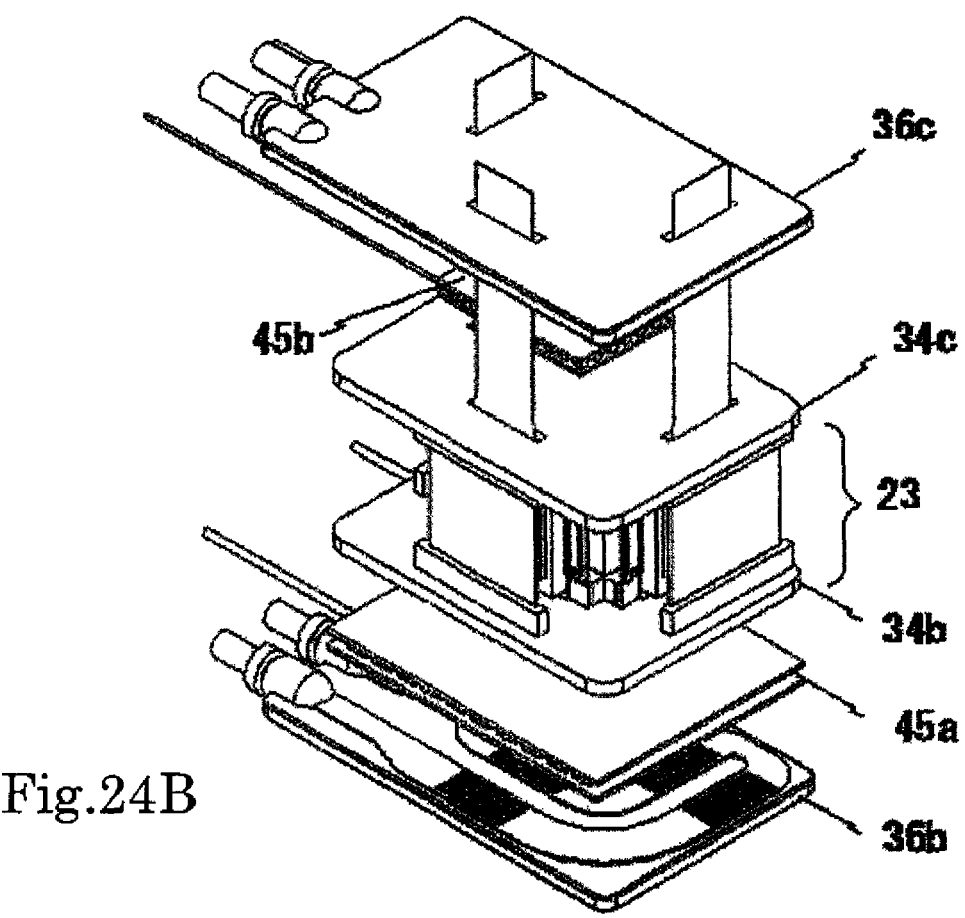

FIGS. 24A, 24B illustrate a liquid crystal projector apparatus in which Peltier elements are applied to the liquid crystal cooling structure shown in the aforementioned second embodiment. A pair of Peltier elements 45a, 45b are bonded between each of a pair of first holder member 34b and second holder member 34c for holding liquid crystal unit 23 from above and from below and each of a pair of first lower heat exchanger 36b and second upper heat exchanger 36c corresponding to first and second holder members 34b, 34c, such that each of Peltier elements 45a, 45b has its lower temperature side directed to the surface of associated holder member 34b, 34c.

With the foregoing structure, the pair of first lower holder member 34b and second upper holder member 34c connected to heat absorbing surfaces 46a, 46b of Peltier elements 45a, 45b are cooled down to an outside air temperature or lower, and heat generated by the thermoelectric elements is received by the pair of first heat exchanger 36b and second heat exchanger 36c connected to heat generating surfaces 47a, 47b, and coolant liquid 31 can be cooled down by a radiator (not shown) of the liquid cooling module.

As described above, by using a liquid crystal unit cooling structure employing Peltier elements, it is possible to largely reduce an operating temperature of the liquid crystal units and further prolong the lifetime of the liquid crystal units.

Figure 25:
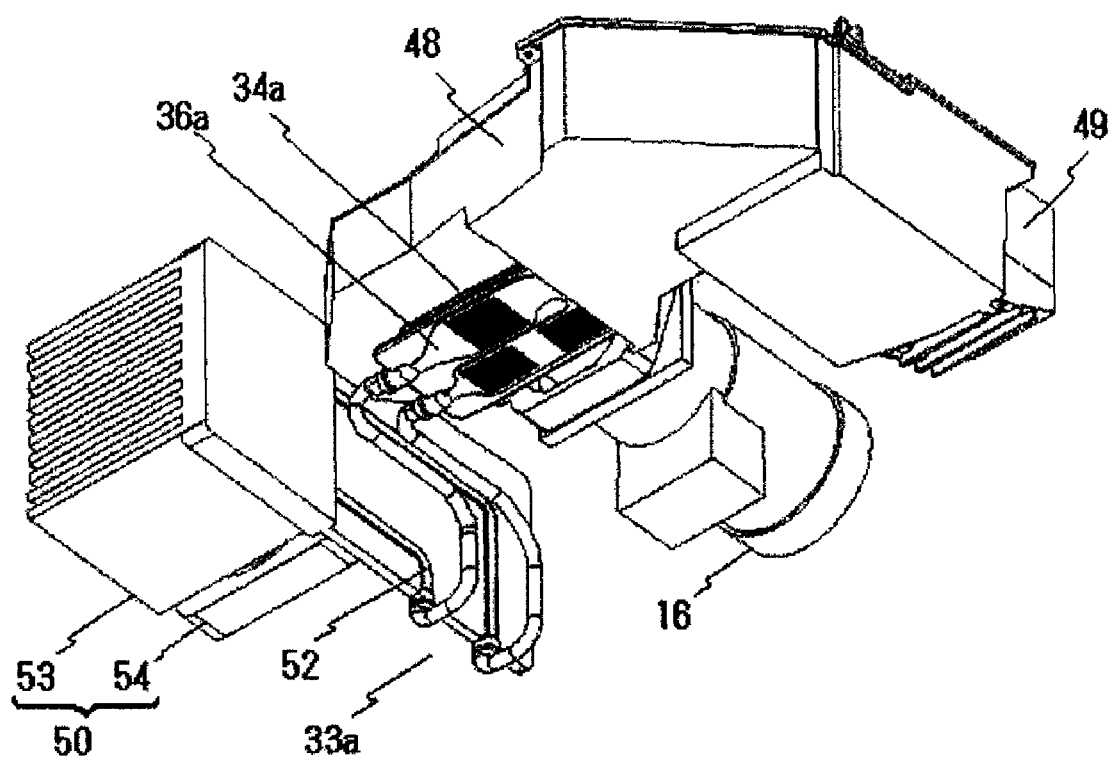
FIG. 25 is a perspective view illustrating part of a liquid crystal unit and a liquid crystal unit cooling system in a liquid crystal projector apparatus according to a ninth embodiment of the present invention.

Next, a liquid crystal projector apparatus according to a ninth embodiment of the present invention will be described with reference to FIG. 25. The liquid crystal projector apparatus according to the ninth embodiment can be used to more thoroughly prevent dust particles from introducing into a liquid crystal units etc. FIG. 25 is a perspective view illustrating part of a liquid crystal unit and a liquid crystal unit cooling system of the liquid crystal projector apparatus, taken from the back side.

Figure 1:
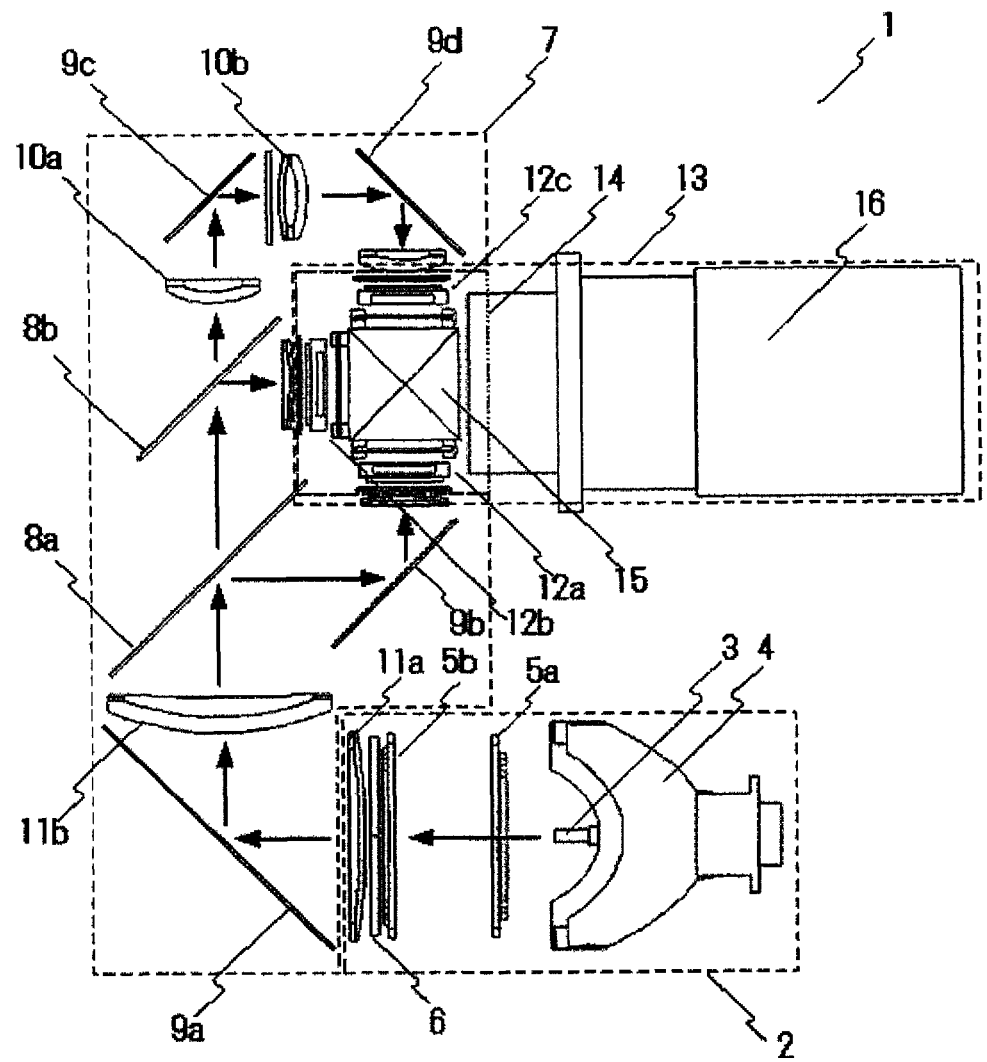
FIG. 1 is a diagram generally illustrating the basic configuration of an optical system in a conventional liquid crystal projector apparatus.
Figure 2A:
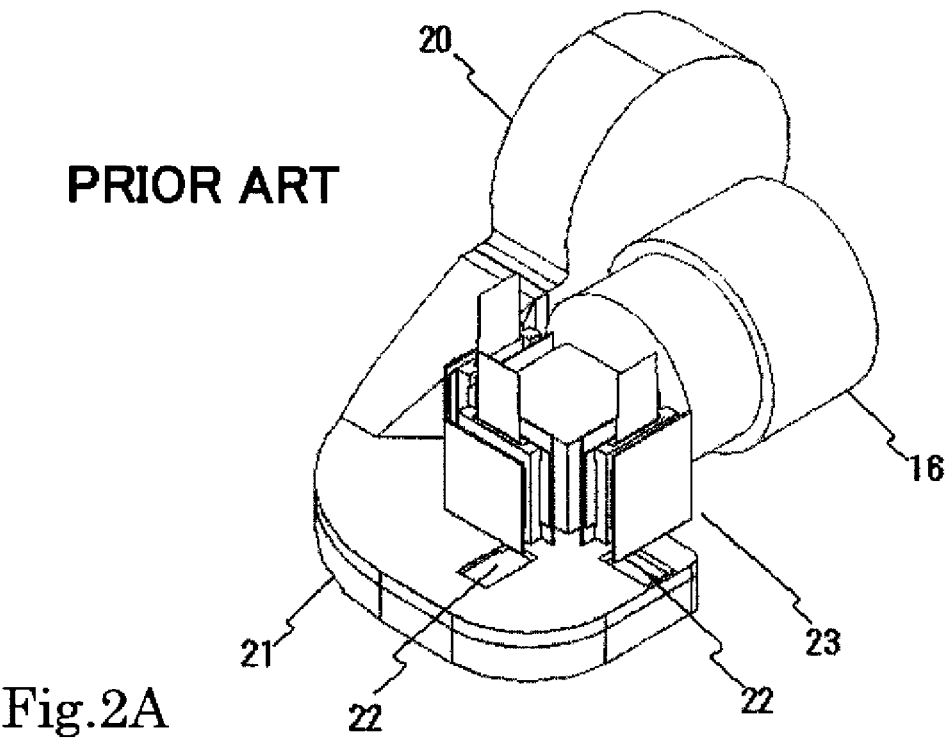
FIGS. 2A, 2B are a perspective view and a cross-sectional view, respectively, illustrating a liquid crystal unit cooling structure (air cooling) of a conventional liquid crystal projector apparatus.
Figure 2B:
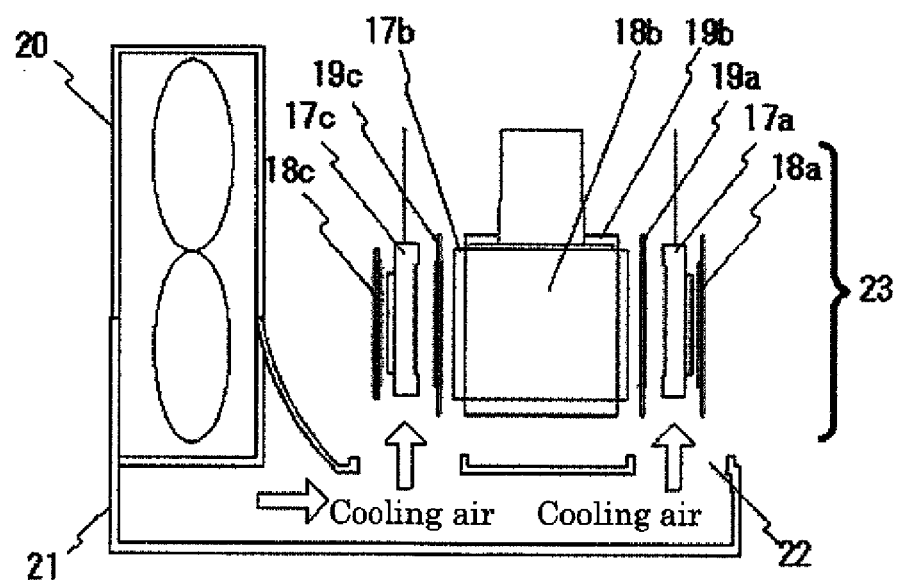
Figure 3A:
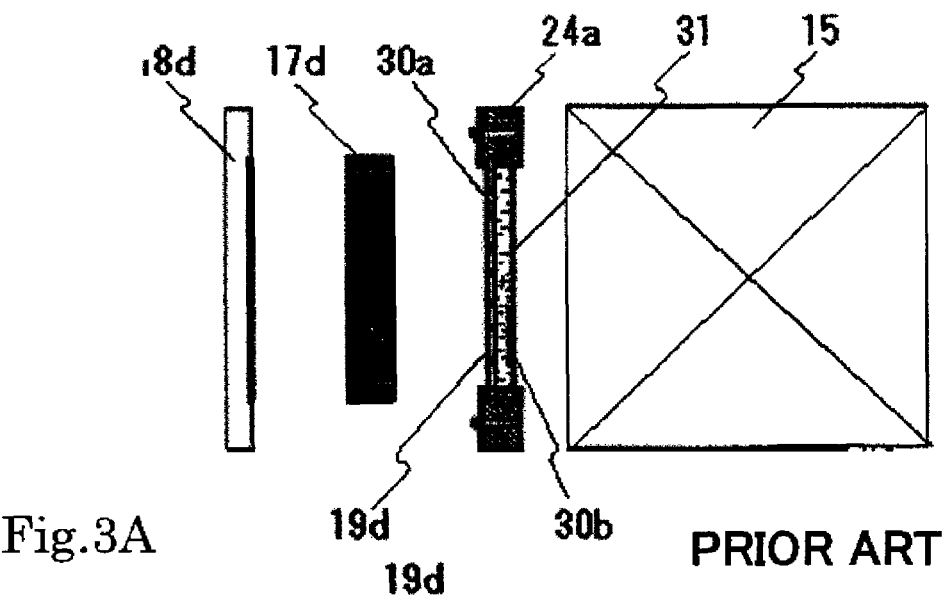
FIGS. 3A, 3B are a perspective view and a cross-sectional view, respectively, illustrating a liquid crystal unit cooling structure (liquid cooling) of a conventional liquid crystal projector apparatus.
Figure 3B:
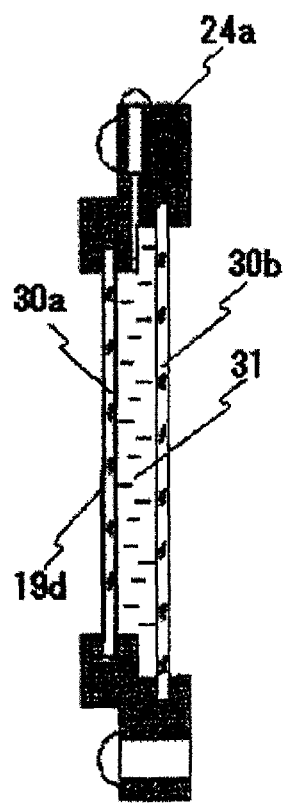
Figure 5A:
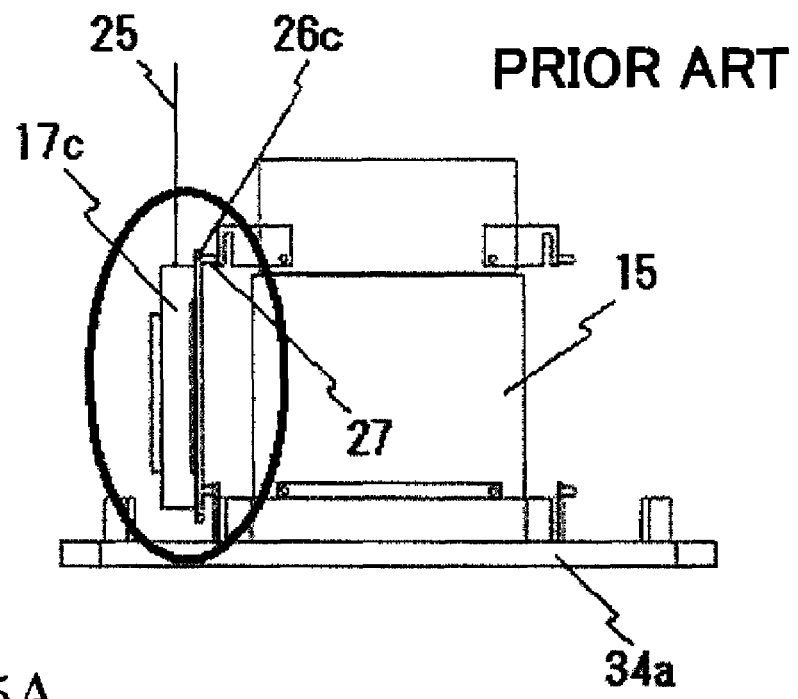
FIGS. 5A, 5B are a side view and a detailed view, respectively, of a liquid crystal panel holder of a conventional liquid crystal projector apparatus.
Figure 5B:
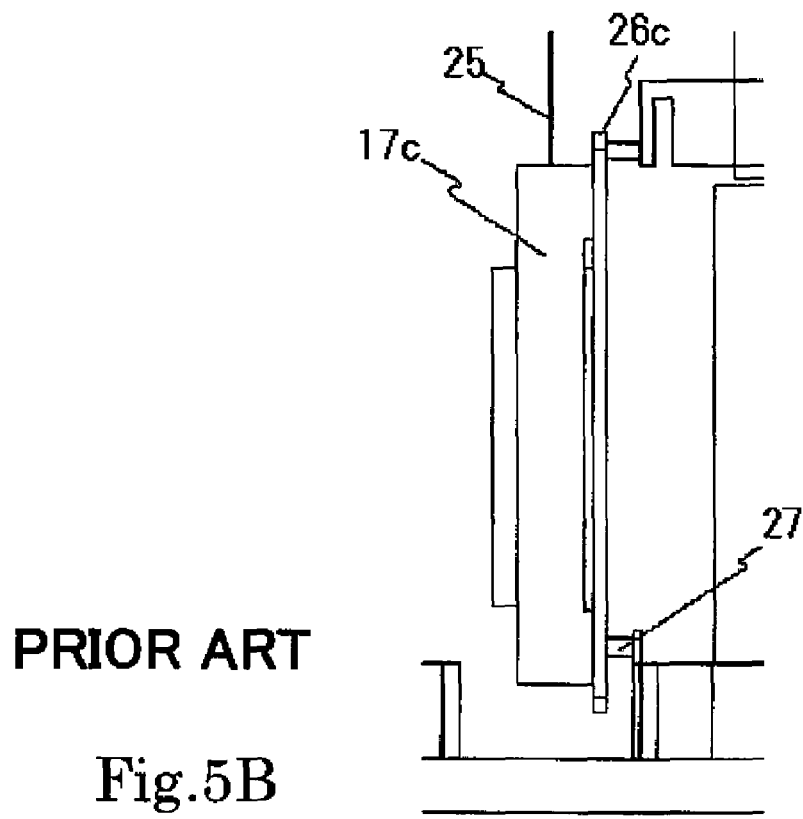

The liquid crystal projector apparatus of the ninth embodiment is characterized in that an optical engine represented by the liquid crystal unit, i.e., the optical engine comprised of illumination optical system 2, color separating optical system 7, and light composing optical system 13 illustrated in FIG. 1, are installed in a sealed structure.

Optical system holder member 48 holds and fixes a multiplicity of lenses and mirrors, which make up the optical engine, and sealingly encloses these components of the optical engine to form an isolated space within the housing of liquid crystal projector apparatus 1. The bottom surface of optical system holder member 48 partially includes holder member 34a. Therefore, liquid crystal unit 23 is cooled down in a manner similar to that shown in the first embodiment, i.e., by absorbing generated heat into first holder member 34a through solid heat conduction, and emitting the heat to the outside through coolant liquid 10 from radiator 50 by way of first heat exchanger 36a.

In the ninth embodiment, the optical engine is sealed by optical system holder member 48 such that liquid crystal unit 23 can be cooled down while it is substantially isolated from air circulating within the housing, even when external air is introduced into the housing in a manner similar to the prior art for purposes of cooling a power supply, substrates, lamp, and the like. The foregoing structure can block dust particles which would otherwise introduce into liquid crystal unit 23, thereby making it possible to provide a liquid crystal projector apparatus which excels more in reliability. It should be understood that the ninth embodiment can be applied as appropriate in combination with the aforementioned second to eighth embodiments.

While detailed description on the respective embodiments has been made above in connection with a liquid cooling scheme, the liquid crystal projector apparatus of the present invention is not limited to the liquid cooling scheme, but can also employ, for example, an air cooling scheme.

In the air cooling scheme, an air cooling unit in a simple structure can be employed with an aluminum heat sink connected to a heat absorbing holder in place of a water cooling jacket for dissipating heat. The "air cooling unit" used herein does not refer to a structure for feeding air to a liquid crystal unit itself as in the prior art, but to design the first heat exchanger and second heat exchanger themselves using the air cooling scheme. For example, in a radiator of a popularly-priced projector which is required to be small in size and low in cost but provides a low luminance and generates a small amount of heat, an air cooling unit which has a small heat radiation capacity may be replaced for a liquid cooling unit.

Further, the present invention can also be applied completely in a similar manner to a single-plate type liquid crystal panel, i.e., a liquid crystal projector apparatus which comprises a single liquid crystal panel that has a color filter which passes predetermined color light therethrough separately for each of cells which make up the liquid crystal panel.

While certain preferred embodiments of the present invention have been shown and described in detail, it should be understood that various changes and modifications may be made without departing from the spirit or scope of the appended claims.

What is claimed is:

1. A liquid crystal projector apparatus comprising:
a liquid crystal panel for modulating light;
an incident side polarizing plate and an exit side polarizing plate disposed in front of and behind said liquid crystal panel along an optical axis, respectively;
a first holder member for holding said liquid crystal panel;
a first heat exchanger disposed in close proximity to said first holder member for dissipating heat generated by said liquid crystal panel, said incident side polarizing plate, or said exit side polarizing plate, and then conducted to said first holder member, said first heat exchanger including a first channel formed therein for passing a coolant liquid therethrough for dissipating the heat;
a circulator constructed and arranged to circulate said coolant liquid; and
a coolant liquid cooler;
wherein:
said first heat exchanger is disposed on a surface of said first holder member opposite to a surface for holding said liquid crystal panel, said incident side polarizing plate, and said exit side polarizing plate,
said first channel passes through positions substantially opposite to positions at which said liquid crystal panel, said incident side polarizing plate, and said exit side polarizing plate are held by said first holder member,
said liquid crystal panel comprises a plurality of liquid crystal panels for modulating different color light, respectively,
said first channel first passes through the position substantially opposite to the position at which the liquid crystal panel generating the largest amount of heat among said plurality of liquid crystal panels is held by said first holder member,
said plurality of liquid crystal panels have three liquid crystal panels for modulating blue light, green light, and red light, respectively, and
said first channel passes through positions, in an order of the position substantially opposite to the position at which said liquid crystal panel for modulating blue light is held by said first holder member, the position substantially opposite to the position at which said liquid crystal panel for modulating green light is held by said first holder member, and the position substantially opposite to the position at which said liquid crystal panel for modulating red light is held by said first holder member, further comprising:
a second holder member for holding said liquid crystal panel, said incident side polarizing plate, and said exit side polarizing plate between said first holder member and said second holder member; and
a second heat exchanger disposed in close proximity to said second holder member for dissipating heat generated by said liquid crystal panel, said incident side polarizing plate, or said exit side polarizing plate, and then conducted to said second holder member;
wherein:
said second heat exchanger includes a second channel formed therein for passing a coolant liquid therethrough for dissipating the heat,
said second heat exchanger is disposed on a surface of said second holder member opposite to a surface for holding said liquid crystal panel, said incident side polarizing plate, and said exit side polarizing plate,
said second channel passes through positions substantially opposite to positions at which said liquid crystal panel, said incident side polarizing plate, and said exit side polarizing plate are held by said second holder member, and
said second channel first passes through the position substantially opposite to the position at which the liquid crystal panel generating the largest amount of heat among said plurality of liquid crystal panels is held by said second holder member.

2. A cooler for cooling a plurality of heat-generating objects that generate different amounts of heat from one another, comprising:
a first holder member for holding the plurality of heat-generating objects;
a first heat exchanger disposed in close proximity to said first holder member for dissipating heat generated by the heat-generating objects, and then conducted to said first holder member, said first heat exchanger including a first channel formed therein for passing a coolant liquid therethrough for dissipating the heat;
a circulator constructed and arranged to circulate said coolant liquid; and
a coolant liquid cooler;
wherein:
said first heat exchanger is disposed on a surface of said first holder member opposite to a surface for holding the heat-generating objects,
said first channel passes through positions substantially opposite to positions at which the heat-generating objects are held by said first holder member,
said first channel first passes sequentially through positions opposite the plurality of heat-generating objects in an order that corresponds to the amount of heat generated by the heat-generating objects, beginning with the heat-generating object that generates the greatest amount of heat, and ending with the heat-generating object that generates the least amount of heat,
wherein said first channel is arranged to have a width that differs as said first channel first passes sequentially through positions opposite the plurality of heat-generating objects, such that the width of the first channel is greatest as the first channel passes opposite the heat-generating object that generates the greatest amount of heat, and the width of the first channel is least as the first channel passes opposite the heat-generating object that generates the smallest amount of heat.

* * * * *